(12) United States Patent
Hua et al.

(10) Patent No.: US 12,563,548 B2
(45) Date of Patent: Feb. 24, 2026

(54) CROSS-CARRIER SCHEDULING METHOD, TERMINAL DEVICE, AND ACCESS NETWORK DEVICE

(71) Applicant: HUAWEI TECHNOLOGIES CO., LTD., Guangdong (CN)

(72) Inventors: Meng Hua, Shanghai (CN); Jinlin Peng, Shanghai (CN); Yi Wang, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 368 days.

(21) Appl. No.: 18/304,526

(22) Filed: Apr. 21, 2023

(65) Prior Publication Data

US 2023/0262686 A1 Aug. 17, 2023

Related U.S. Application Data

(63) Continuation of application No. PCT/CN2020/123449, filed on Oct. 23, 2020.

(51) Int. Cl.
| | |
|---|---|
| *H04W 4/00* | (2018.01) |
| *H04W 72/1263* | (2023.01) |
| *H04W 72/23* | (2023.01) |

(52) U.S. Cl.
CPC ....... *H04W 72/1263* (2013.01); *H04W 72/23* (2023.01)

(58) Field of Classification Search
CPC .......................... H04W 72/1263; H04W 72/23
See application file for complete search history.

(56) References Cited

U.S. PATENT DOCUMENTS

| | | | | |
|---|---|---|---|---|
| 2013/0250874 A1* | 9/2013 | Luo | ........................ | H04W 72/23 |
| | | | | 370/329 |
| 2015/0189627 A1* | 7/2015 | Yang | ......................... | H04L 5/14 |
| | | | | 370/280 |

(Continued)

FOREIGN PATENT DOCUMENTS

| | | |
|---|---|---|
| CN | 104412525 A | 3/2015 |
| CN | 108023714 A | 5/2018 |

(Continued)

OTHER PUBLICATIONS

Nokia et al., "Cross-carrier scheduling from SCell to PCell," 3GPP TSG RAN WG1 #102, R1-2006469, e-Meeting, Aug. 17-28, 2020, 12 pages.

(Continued)

*Primary Examiner* — Abdelnabi O Musa
(74) *Attorney, Agent, or Firm* — Fish & Richardson P.C.

(57) ABSTRACT

Embodiments of this application provide cross-carrier scheduling methods, terminal devices, access network devices, and chips. In an example method, the terminal device receives first indication information when monitoring, in at least one user equipment (UE)-specific search space (USS) in a first cell, a physical downlink control channel (PDCCH) for scheduling data of a third cell. The terminal device stops, based on the first indication information, monitoring, in the at least one USS in the first cell, the PDCCH for scheduling the data of the third cell, and determines to monitor, in at least one USS in a second cell, a PDCCH for scheduling the data of the third cell, to implement switching between USSs in two cells.

20 Claims, 5 Drawing Sheets

Mobile communication system 100

(56)                References Cited

U.S. PATENT DOCUMENTS

| | | | | | |
|---|---|---|---|---|---|
| 2021/0112585 | A1* | 4/2021 | Ji | .......................... | H04W 72/23 |
| 2022/0029758 | A1* | 1/2022 | Bae | ...................... | H04W 72/23 |
| 2022/0240284 | A1* | 7/2022 | Zhou | .................... | H04W 72/23 |
| 2022/0321288 | A1* | 10/2022 | Takeda | ................. | H04W 48/12 |
| 2022/0346131 | A1* | 10/2022 | Shi | ........................ | H04L 5/0078 |
| 2024/0306080 | A1* | 9/2024 | Park | ..................... | H04L 5/0094 |

FOREIGN PATENT DOCUMENTS

| | | |
|---|---|---|
| CN | 110351841 A | 10/2019 |
| CN | 110740479 A | 1/2020 |
| EP | 3907919 A2 | 11/2021 |

OTHER PUBLICATIONS

3GPP TS 38.133 V16.5.0, "3rd Generation Partnership Project; Technical Specification Group Radio Access Network; NR; Requirements for support of radio resource management (Release 16)," Sep. 2020, 1607 pages.

MediaTek Inc., "Discussion on BWP transition time," 3GPP TSG-RAN WG4 AH1801 Meeting, R4-1800107, San Diego, CA, USA, Jan. 21-26, 2017, 9 pages.

3GPP TS 38.213 V16.3.0, "3rd Generation Partnership Project; Technical Specification Group Radio Access Network; NR; Physical layer procedures for control (Release 16)," Sep. 2020, 179 pages.

Huawei et al, "Discussion on SCell activation and deactivation," 3GPP TSG RAN WG1 Meeting #98, RI-1908099, Prague, Czech Republic, Aug. 26-30, 2019, 17 pages.

3GPP TS 38.306 V16.2.0, "3rd Generation Partnership Project; Technical Specification Group Radio Access Network; NR; User Equipment (UE) radio access capabilities (Release 16)," Sep. 2020, 126 pages.

LG Electronics, "Discussion on cross-carrier scheduling from SCell to PCell," 3GPP TSG RAN WG1 #102-e, R1-2006318, e-Meeting, Aug. 17-28, 2020, 3 pages.

3GPP TS 38.331 V16.2.0, "3rd Generation Partnership Project; Technical Specification Group Radio Access Network; NR; Radio Resource Control (RRC) protocol specification (Release 16)," Sep. 2020, 921 pages.

Intel Corporation, "On SCell scheduling PCell transmissions," 3GPP TSG RAN WG1 Meeting #102_e, R1-2005900, e-Meeting, Aug. 17-28, 2020, 3 pages.

Samsung, "Cross-carrier scheduling from SCell to PCell," 3GPP TSG RAN WG1 #102-e, R1-2006176, e-Meeting, Aug. 17-28, 2020, 5 pages.

ETRI, "Discussion on cross-carrier scheduling for NR DSS," 3GPP TSG RAN WG1 #102-e, R1-2006362, e-Meeting, Aug. 17-28, 2020, 3 pages.

Extended European Search Report in European Appln No. 20958381. 4, dated Nov. 7, 2023, 11 pages.

International Search Report and Written Opinion in International Appln. No. PCT/CN2020/123449, mailed on Jul. 27, 2021, 14 pages (with English translation).

* cited by examiner

Mobile communication system 100

FIG. 2

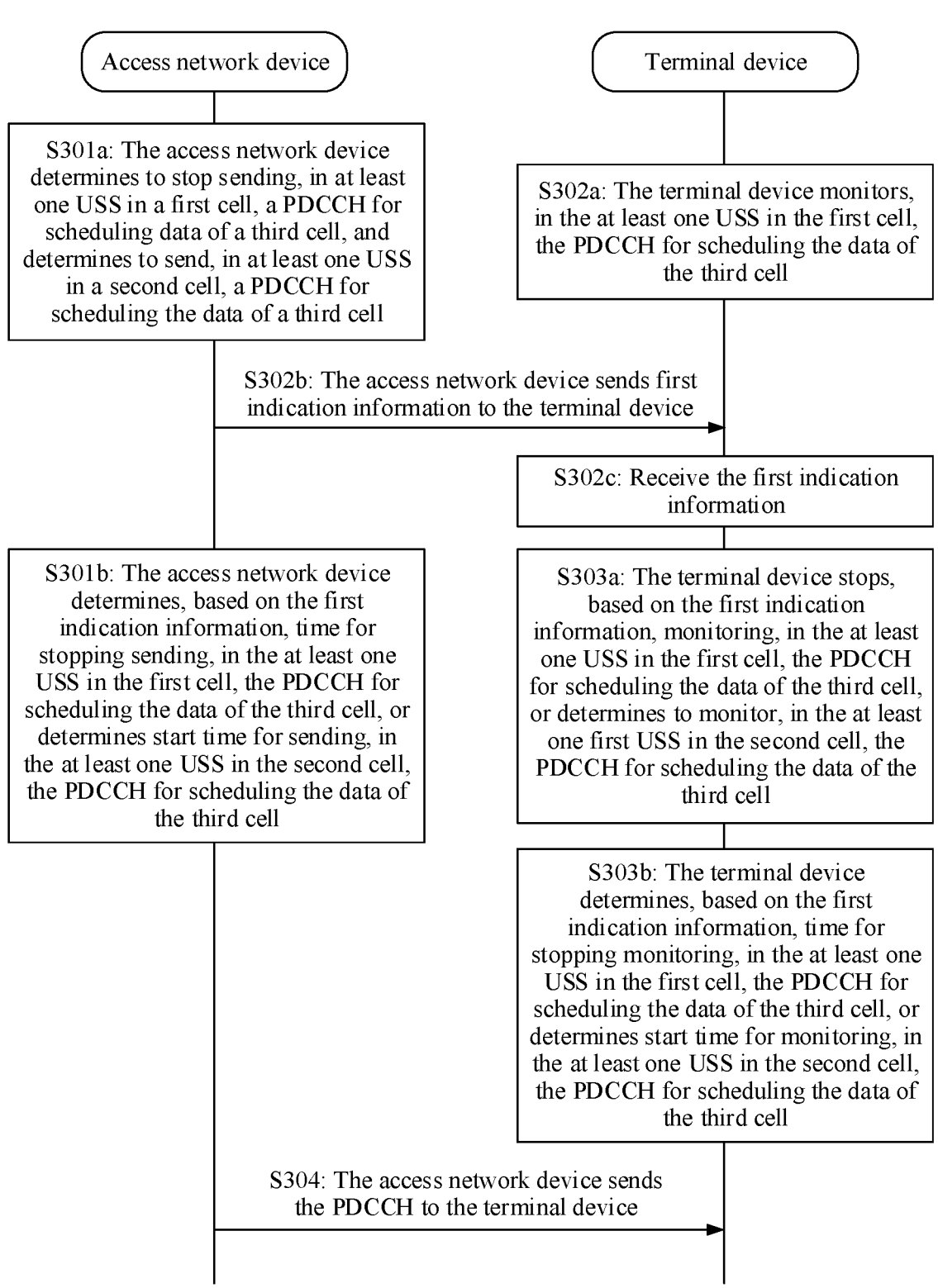

Access network device

Terminal device

S301a: The access network device determines to stop sending, in at least one USS in a first cell, a PDCCH for scheduling data of a third cell, and determines to send, in at least one USS in a second cell, a PDCCH for scheduling the data of a third cell S302a: The terminal device monitors, in the at least one USS in the first cell, the PDCCH for scheduling the data of the third cell S302b: The access network device sends first indication information to the terminal device S302c: Receive the first indication information S301b: The access network device determines, based on the first indication information, time for stopping sending, in the at least one USS in the first cell, the PDCCH for scheduling the data of the third cell, or determines start time for sending, in the at least one USS in the second cell, the PDCCH for scheduling the data of the third cell S303a: The terminal device stops, based on the first indication information, monitoring, in the at least one USS in the first cell, the PDCCH for scheduling the data of the third cell, or determines to monitor, in the at least one first USS in the second cell, the PDCCH for scheduling the data of the third cell S303b: The terminal device determines, based on the first indication information, time for stopping monitoring, in the at least one USS in the first cell, the PDCCH for scheduling the data of the third cell, or determines start time for monitoring, in the at least one USS in the second cell, the PDCCH for scheduling the data of the third cell S304: The access network device sends the PDCCH to the terminal device

FIG. 4

CROSS-CARRIER SCHEDULING METHOD, TERMINAL DEVICE, AND ACCESS NETWORK DEVICE

CROSS-REFERENCE TO RELATED APPLICATIONS

This application is a continuation of International Application No. PCT/CN2020/123449, filed on Oct. 23, 2020, the disclosure of which is hereby incorporated by reference in its entirety.

TECHNICAL FIELD

This application relates to the field of communication technologies, and in particular, to a cross-carrier scheduling method, a terminal device, and an access network device.

BACKGROUND

In the 5th generation mobile communication technology (5th generation mobile network, 5th generation wireless system, or 5th-Generation, 5G or 5G technology for short) Standard Release 15 and Release 16, cross-carrier scheduling means that one carrier schedules another carrier, that is, a physical downlink control channel (PDCCH) for scheduling data transmission of a carrier is sent on another carrier. For example, a carrier of a primary cell (PCell) schedules a carrier of a secondary cell (SCell), or a carrier of a secondary cell SCell schedules a carrier of another secondary cell SCell. To relieve a control channel payload on the primary cell PCell, a new 5G technology is currently being discussed. For example, a carrier of a secondary cell SCell may schedule a carrier of a primary cell PCell. However, at a specific time point, only one of the SCell and the PCell may have a UE-specific search space (USS) effectively for scheduling the PCell. Therefore, how to efficiently switch between USSs on bandwidth parts (BWPs) of two cells becomes an urgent problem to be resolved.

SUMMARY

Embodiments of this application provide a cross-carrier scheduling method, a terminal device, and an access network device, to implement efficient switching between USSs on BWPs of two cells.

To achieve the foregoing objectives, the following technical solutions are used in embodiments of this application.

According to a first aspect, an embodiment of this application provides a cross-carrier scheduling method. The method includes: A terminal device monitors, in at least one USS in a first cell, a PDCCH for scheduling data of a third cell, and receives first indication information, where the first indication information is for determining to stop monitoring, in the at least one USS in the first cell, the PDCCH for scheduling the data of the third cell, or determining to monitor, in at least one USS in a second cell, a PDCCH for scheduling the data of the third cell, and the third cell is the first cell or the second cell; and the terminal device stops, based on the first indication information, monitoring, in the at least one USS in the first cell, the PDCCH for scheduling the data of the third cell, and determines to monitor, in the at least one USS in the second cell, the PDCCH for scheduling the data of the third cell, to achieve efficient switching between USSs in two cells.

With reference to the first aspect, in a possible implementation, the first indication information includes at least one of the following indications: an indication for deactivating the first cell; an indication for switching a BWP in the first cell, where the indication for switching the BWP indicates that no first USS exists on a BWP to be switched to, and the first USS is a USS that includes a PDCCH candidate capable of carrying a PDCCH for scheduling data of the first cell; an indication for configuring the first cell to a dormancy cell; and an indication for switching a search space set in the first cell, where the indication for switching the search space set indicates that no first USS exists in a search space set to be switched to.

With reference to the first aspect, in a possible implementation, the first indication information includes at least one of the following indications: an indication for activating the second cell, where a first USS exists in a search space set of the activated second cell, and the first USS is a USS that includes a PDCCH candidate capable of carrying a PDCCH for scheduling data of the first cell; an indication for switching a BWP in the second cell, where the indication for switching the BWP indicates that the first USS exists on a BWP to be switched to; an indication for configuring the second cell to a non-dormancy cell, where the first USS exists in a search space set of the non-dormancy second cell; and an indication for switching a search space set in the second cell, where the indication for switching the search space set indicates that the first USS exists in a search space set to be switched to.

With reference to the first aspect, in a possible implementation, the first indication information includes first-type indication information and second-type indication information, the first-type indication information is for determining to monitor, in a first set of USSs that belongs to the first USS in the second cell, a PDCCH for scheduling the data of the third cell; and the second-type indication information is for determining to monitor, in a second set of USSs that belongs to the first USS in the second cell, a PDCCH for scheduling the data of the third cell.

With reference to the first aspect, in a possible implementation, the cross-carrier scheduling method provided in this embodiment of this application further includes: The terminal device determines, based on the first indication information, time for stopping monitoring, in the at least one USS in the first cell, the PDCCH for scheduling the data of the third cell, or determines start time for monitoring, in the at least one USS in the second cell, the PDCCH for scheduling the data of the third cell.

With reference to the first aspect, in a possible implementation, when the first indication information is carried in the RRC signaling or a MAC-CE, that the terminal device determines, based on the first indication information, time for stopping monitoring, in the at least one USS in the first cell, the PDCCH for scheduling the data of the third cell, or determines start time for monitoring, in the at least one USS in the second cell, the PDCCH for scheduling the data of the third cell is specifically as follows: The terminal device determines, based on valid time of deactivation of the first cell, the start time for monitoring, in the at least one USS in the second cell, the PDCCH for scheduling the data of the third cell; or the terminal device determines, based on valid time of activation of the second cell, the time for stopping monitoring, in the at least one USS in the first cell, the PDCCH for scheduling the data of the third cell.

With reference to the first aspect, in a possible implementation, when the first indication information is carried in downlink control information DCI, that the terminal device determines, based on the first indication information, time for stopping monitoring, in the at least one USS in the first cell, the PDCCH for scheduling the data of the third cell, or determines start time for monitoring, in the at least one USS in the second cell, the PDCCH for scheduling the data of the third cell is specifically as follows: The terminal device determines, based on the DCI and time specified in a protocol, the time for stopping monitoring, in the at least one USS in the first cell, the PDCCH for scheduling the data of the third cell, or determines the start time for monitoring, in the at least one USS in the second cell, the PDCCH for scheduling the data of the third cell; the terminal device determines, based on the DCI and time of switching a search space set, the time for stopping monitoring, in the at least one USS in the first cell, the PDCCH for scheduling the data of the third cell, or determines the start time for monitoring, in the at least one USS in the second cell, the PDCCH for scheduling the data of the third cell; the terminal device determines based on the DCI and configured minimum K0, the time for stopping monitoring, in the at least one USS in the first cell, the PDCCH for scheduling the data of the third cell, or determines the start time for monitoring, in the at least one USS in the second cell, the PDCCH for scheduling the data of the third cell; or the terminal device determines, based on a larger one of the configured minimum K0 and time of switching a search space group, the time for stopping monitoring, in the at least one USS in the first cell, the PDCCH for scheduling the data of the third cell, or determines the start time for monitoring, in the at least one USS in the second cell, the PDCCH for scheduling the data of the third cell.

With reference to the first aspect, in a possible implementation, that the terminal device determines, based on the first indication information, time for stopping monitoring, in the at least one USS in the first cell, the PDCCH for scheduling the data of the third cell, or determines start time for monitoring, in the at least one USS in the second cell, the PDCCH for scheduling the data of the third cell is specifically as follows: The terminal device determines, based on valid time of switching a BWP in the first cell, the start time for monitoring, in the at least one USS in the second cell, the PDCCH for scheduling the data of the third cell, where the indication for switching the BWP indicates that no first USS exists on a BWP to be switched to, and the first USS is a USS that includes a PDCCH candidate capable of carrying a PDCCH for scheduling the data of the third cell; or the terminal device determines, based on valid time of switching a BWP in the second cell, the time for stopping monitoring, in the at least one USS in the first cell, the PDCCH for scheduling the data of the third cell, where the indication for switching the BWP indicates that a first USS exists on a BWP to be switched to, and the first USS is a USS that includes a PDCCH candidate capable of carrying a PDCCH for scheduling the data of the third cell.

With reference to the first aspect, in a possible implementation, that the terminal device determines, based on the first indication information, time for stopping monitoring, in the at least one USS in the first cell, the PDCCH for scheduling the data of the third cell, or determines start time for monitoring, in the at least one USS in the second cell, the PDCCH for scheduling the data of the third cell is specifically as follows: The terminal device determines, based on valid time at which the first cell is a dormancy cell, the start time for monitoring, in the at least one USS in the second cell, the PDCCH for scheduling the data of the third cell; or the terminal device determines, based on valid time at which the second cell is a non-dormancy cell, the time for stopping monitoring, in the at least one USS in the first cell, the PDCCH for scheduling the data of the third cell.

With reference to the first aspect, in a possible implementation, that the terminal device determines, based on the first indication information, time for stopping monitoring, in the at least one USS in the first cell, the PDCCH for scheduling the data of the third cell, or determines start time for monitoring, in the at least one USS in the second cell, the PDCCH for scheduling the data of the third cell is specifically: The terminal device determines, based on time of switching a search space set in the first cell, the start time for monitoring, in the at least one USS in the second cell, the PDCCH for scheduling the data of the third cell, where the indication for switching the search space set indicates that no first USS exists in a search space set to be switched to; or the terminal device determines, based on time of switching a search space set in the second cell, the time for stopping monitoring, in the at least one USS in the first cell, the PDCCH for scheduling the data of the third cell, where the indication for switching the search space set indicates that the first USS exists in a search space set to be switched to.

In this embodiment of this application, in different scenarios, the terminal device determines the time for stopping monitoring, in the at least one USS in the first cell, the PDCCH for scheduling the data of the third cell; or determines the start time of monitoring, in the at least one USS in the second cell, the PDCCH for scheduling the data of the third cell, to ensure efficient switching between the two cells and reduce impact on scheduling of the first cell.

According to a second aspect, an embodiment of this application provides a cross-carrier scheduling method. The method includes: An access network device determines to stop sending, in at least one USS in a first cell, a PDCCH for scheduling data of a third cell, and determines to send, in at least one first USS in a second cell, a PDCCH for scheduling the data of the third cell, where the third cell is the first cell or the second cell; and the access network device sends first indication information to a terminal device, where the first indication information indicates the terminal device to determine to stop monitoring, in the at least one USS in the first cell, the PDCCH for scheduling the data of the third cell, or determines to monitor, in the at least one USS in the second cell, the PDCCH for scheduling the data of the third cell, to implement efficient switching between USSs in two cells.

With reference to the second aspect, in a possible implementation, the first indication information includes at least one of the following indications: an indication for deactivating the first cell; an indication for switching a BWP in the first cell, where the indication for switching the BWP indicates that no first USS exists on a BWP to be switched to, and the first USS is a USS that includes a PDCCH candidate capable of carrying a PDCCH for scheduling data of the first cell; an indication for configuring the first cell to a dormancy cell; and an indication for switching a search space set in the first cell, where the indication for switching the search space set indicates that no first USS exists in a search space set to be switched to.

With reference to the second aspect, in a possible implementation, the first indication information includes at least one of the following indications: an indication for activating the second cell, where a first USS exists in a search space set of the activated second cell, and the first USS is a USS that includes a PDCCH candidate capable of carrying a PDCCH for scheduling data of the first cell; an indication for switching a BWP in the second cell, where the indication for switching the BWP indicates that the first USS exists on a BWP to be switched to; an indication for configuring the second cell to a non-dormancy cell, where the first USS exists in a search space set of the non-dormancy second cell; and an indication for switching a search space set in the second cell, where the indication for switching the search space set indicates that the first USS exists in a search space set to be switched to.

With reference to the second aspect, in a possible implementation, the first indication information includes first-type indication information and second-type indication information, the first-type indication information indicates the terminal device to determine to monitor, in a first set of USSs that belongs to the first USS in the second cell, a PDCCH for scheduling the data of the third cell; and the second-type indication information indicates the terminal device to determine to monitor, in a second set of USSs that belongs to the first USS in the second cell, a PDCCH for scheduling the data of the third cell.

With reference to the second aspect, in a possible implementation, the cross-carrier scheduling method provided in this application further includes: The access network device determines, based on the first indication information, time for stopping sending, in the at least one USS in the first cell, the PDCCH for scheduling the data of the third cell, or determines start time for sending, in the at least one USS in the second cell, the PDCCH for scheduling the data of the third cell.

With reference to the second aspect, in a possible implementation, when the first indication information is carried in the RRC signaling or a MAC-CE, that the access network device determines, based on the first indication information, time for stopping sending, in the at least one USS in the first cell, the PDCCH for scheduling the data of the third cell, or determines start time for sending, in the at least one USS in the second cell, the PDCCH for scheduling the data of the third cell is specifically as follows: The access network device determines, based on valid time of deactivation of the first cell, the start time for sending, in the at least one USS in the second cell, the PDCCH for scheduling the data of the third cell; or the access network device determines, based on valid time of activation of the second cell, the time for stopping sending, in the at least one USS in the first cell, the PDCCH for scheduling the data of the third cell.

With reference to the second aspect, in a possible implementation, when the first indication information is carried in downlink control information DCI, that the access network device determines, based on the first indication information, time for stopping sending, in the at least one USS in the first cell, the PDCCH for scheduling the data of the third cell, or determines start time for sending, in the at least one USS in the second cell, the PDCCH for scheduling the data of the third cell is specifically as follows: The access network device determines, based on the DCI and time specified in a protocol, the time for stopping sending, in the at least one USS in the first cell, the PDCCH for scheduling the data of the third cell, or determines the start time for sending, in the at least one USS in the second cell, the PDCCH for scheduling the data of the third cell; the access network device determines, based on the DCI and time of switching a search space set, the time for stopping sending, in the at least one USS in the first cell, the PDCCH for scheduling the data of the third cell, or determines the start time for sending, in the at least one USS in the second cell, the PDCCH for scheduling the data of the third cell; the access network device determines, based on the DCI and configured minimum K0, the time for stopping sending, in the at least one USS in the first cell, the PDCCH for scheduling the data of the third cell, or determines the start time for sending, in the at least one USS in the second cell, the PDCCH for scheduling the data of the third cell; or the access network device determines, based on a larger one of the configured minimum K0 and time of switching a search space group, the time for stopping sending, in the at least one USS in the first cell, the PDCCH for scheduling the data of the third cell, or determines the start time for sending, in the at least one USS in the second cell, the PDCCH for scheduling the data of the third cell.

With reference to the second aspect, in a possible implementation, that the access network device determines, based on the first indication information, time for stopping sending, in the at least one USS in the first cell, the PDCCH for scheduling the data of the third cell, or determines start time for sending, in the at least one USS in the second cell, the PDCCH for scheduling the data of the third cell is specifically as follows: The access network device determines, based on valid time of switching a BWP in the first cell, the start time for sending, in the at least one USS in the second cell, the PDCCH for scheduling the data of the third cell, where the indication for switching the BWP indicates that no first USS exists on a BWP to be switched to, and the first USS is a USS that includes a PDCCH candidate capable of carrying a PDCCH for scheduling the data of the third cell; or the access network device determines, based on valid time of switching a BWP in the second cell, the time for stopping sending, in the at least one USS in the first cell, the PDCCH for scheduling the data of the third cell, where the indication for switching the BWP indicates that a first USS exists on a BWP to be switched to, and the first USS is a USS that includes a PDCCH candidate capable of carrying a PDCCH for scheduling the data of the third cell.

With reference to the second aspect, in a possible implementation, that the access network device determines, based on the first indication information, time for stopping sending, in the at least one USS in the first cell, the PDCCH for scheduling the data of the third cell, or determines start time for sending, in the at least one USS in the second cell, the PDCCH for scheduling the data of the third cell is specifically as follows: The access network device determines, based on valid time at which the first cell is a dormancy cell, the start time for sending, in the at least one USS in the second cell, the PDCCH for scheduling the data of the third cell; or the access network device determines, based on valid time at which the second cell is a non-dormancy cell, the time for stopping sending, in the at least one USS in the first cell, the PDCCH for scheduling the data of the third cell.

With reference to the second aspect, in a possible implementation, that the access network device determines, based on the first indication information, time for stopping sending, in the at least one USS in the first cell, the PDCCH for scheduling the data of the third cell, or determines start time for sending, in the at least one USS in the second cell, the PDCCH for scheduling the data of the third cell is specifically as follows: The access network device determines, based on time of switching a search space set in the first cell, the start time for sending, in the at least one USS in the second cell, the PDCCH for scheduling the data of the third cell, where the indication for switching the search space set indicates that no first USS exists in a search space set to be switched to; or the access network device determines, based on time of switching a search space set in the second cell, the time for stopping sending, in the at least one USS in the first cell, the PDCCH for scheduling the data of the third cell, where the indication for switching the search space set indicates that the first USS exists in a search space set to be switched to.

In this embodiment of this application, in different scenarios, the terminal device determines the time for stopping monitoring, in the at least one USS in the first cell, the PDCCH for scheduling the data of the third cell; or determines the start time of monitoring, in the at least one USS in the second cell, the PDCCH for scheduling the data of the third cell, to ensure efficient switching between the two cells and reduce impact on scheduling of the first cell.

According to a third aspect, this application provides a communication apparatus, including a processor, a storage medium, at least one processor, and an interface circuit. The interface circuit is configured to: receive a signal from another communication apparatus other than the communication apparatus and transmit the signal to the processor, or send the signal from the processor to the another communication apparatus other than the communication apparatus. The processor is configured to implement, by using a logic circuit or executing code instructions, the method according to any one of the first aspect or the possible implementations of the first aspect. The communication apparatus may be a terminal device, or may be a chip in the terminal device.

According to a fourth aspect, this application provides a communication apparatus, including a processor, a storage medium, at least one processor, and an interface circuit. The interface circuit is configured to: receive a signal from another communication apparatus other than the communication apparatus and transmit the signal to the processor, or send the signal from the processor to the another communication apparatus other than the communication apparatus. The processor is configured to implement, by using a logic circuit or executing code instructions, the method according to any one of the second aspect or the possible implementations of the second aspect. The communication apparatus may be an access network device, or may be a chip in the access network device.

According to a fifth aspect, this application provides a communication system, including a first communication apparatus and a second communication apparatus. The first communication apparatus is configured to perform the method according to any one of the first aspect or the possible implementations of the first aspect. The second communication apparatus is configured to perform the method according to any one of the second aspect or the possible implementations of the second aspect.

According to a sixth aspect, this application provides a computer-readable storage medium. The computer-readable storage medium stores instructions, and when the instructions run on a computer, the computer is enabled to perform the method according to any one of the first aspect or the possible implementations of the first aspect.

According to a seventh aspect, this application provides a computer-readable storage medium. The computer-readable storage medium stores instructions, and when the instructions are run on a computer, the computer is enabled to perform the method according to any one of the second aspect or the possible implementations of the second aspect.

According to an eighth aspect, this application provides a computer program product including instructions. When the computer program product runs on a computer, the computer is enabled to perform the method according to any one of the first aspect and the possible implementations of the first aspect.

According to a ninth aspect, this application provides a computer program product including instructions. When the computer program product runs on a computer, the computer is enabled to perform the method according to any one of the second aspect and the possible implementations of the second aspect.

It should be understood that, descriptions of technical features, technical solutions, advantageous effect, or similar words in this application do not imply that all features and advantages can be implemented in any individual embodiment. Instead, it may be understood that, the descriptions of the features or the advantageous effect mean that at least one embodiment includes a specific technical feature, technical solution, or advantageous effect. Therefore, the descriptions of the technical features, the technical solutions, or the advantageous effect in this specification may not necessarily be specific to a same embodiment. Further, the technical features, the technical solutions, and the advantageous effect described in embodiments may be combined in any proper manner. A person skilled in the art may understand that an embodiment may be implemented without one or more specific technical features or technical solutions, or advantageous effect in the specific embodiment. In other embodiments, additional technical features and advantageous effect may be identified in a specific embodiment that does not reflect all embodiments.

BRIEF DESCRIPTION OF DRAWINGS

FIG. 2 is a schematic diagram of hardware structures of an access network device and a terminal device according to an embodiment of this application;

FIG. 4 is a flowchart of another cross-carrier scheduling method according to an embodiment of this application.

DESCRIPTION OF EMBODIMENTS

In descriptions of this application, unless otherwise specified, "/" means "or". For example, AB may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

A term such as "example" or "for example" is used for representing an example, an example illustration, or a description below. Any embodiment or design scheme described as an "example" or "for example" in embodiments of this application should not be explained as being more preferred or having more advantages than another embodiment or design scheme. Exactly, use of the terms such as "for example" or "example" is intended to present a related concept in a specific manner.

Figure 1:
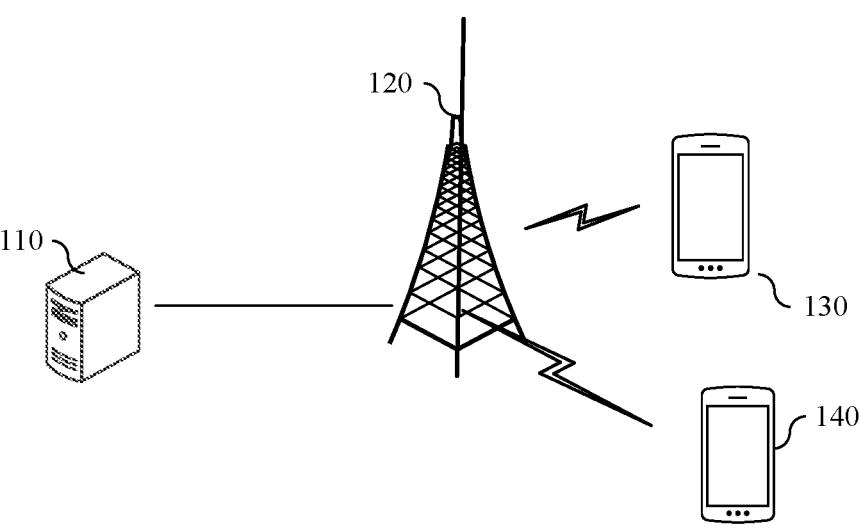
FIG. 1 is a schematic diagram of an architecture of a mobile communication system to which an embodiment of this application is applied.

A cross-carrier scheduling method provided in embodiments of this application is applied to a mobile communication system 100 shown in FIG. 1.

FIG. 1 is a schematic diagram of an architecture of the mobile communication system to which an embodiment of this application is applied. As shown in FIG. 1, the mobile communication system 100 includes a core network device 110, an access network device 120, and at least one terminal device (a terminal device 130 and a terminal device 140 shown in FIG. 1). The terminal device is connected to the access network device 120 in a wireless manner, and the access network device 120 is connected to the core network device 110 in a wireless or wired manner. The core network device 110 and the access network device 120 may be separate and different physical devices, functions of the core network device 110 and logical functions of the access network device 120 may be integrated into a same physical device, or some functions of the core network device and some functions of the access network device may be integrated into a physical device. The terminal device may be located at a fixed position, or may be mobile. FIG. 1 is only a schematic diagram. The communication system may further include another network device, for example, may further include a wireless relay device and a wireless backhaul device, which are not shown in FIG. 1. Quantities of core network devices, radio access network devices, and terminal devices included in the mobile communication system are not limited in embodiments of this application.

The access network device 120 is an access device via which the terminal device accesses the mobile communication system in a wireless manner. The access network device may be a base station NodeB, an evolved NodeB eNodeB, a NodeB in an NR mobile communication system, a NodeB in a future mobile communication system, an access node in a Wi-Fi system, or the like. A specific technology and a specific device form used by the radio access network device are not limited in embodiments of this application.

The terminal device may also be referred to as a terminal, user equipment (UE), a mobile station (MS), a mobile terminal (MT), or the like.

The access network device and the terminal device may be deployed terrestrially, including indoors or outdoors, or may be handheld or vehicle-mounted; or may be deployed on water; or may be deployed on a plane, a balloon, or a man-made satellite in the sky. Application scenarios of the access network device and the terminal device are not limited in embodiments of this application.

Embodiments of this application are applicable to downlink signal transmission, uplink signal transmission, or device-to-device (D2D) signal transmission. For the downlink signal transmission, a sending device is an access network device, and correspondingly a receiving device is a terminal device. For the uplink signal transmission, a sending device is a terminal device, and correspondingly a receiving device is an access network device. For the D2D signal transmission, a sending device is a terminal device, and correspondingly a receiving device is also a terminal device. A signal transmission direction is not limited in embodiments of this application.

Communication between the access network device and the terminal device and communication between the terminal devices may be performed over a licensed spectrum, an unlicensed spectrum, or both a licensed spectrum and an unlicensed spectrum. Communication between the radio access network device and the terminal device and communication between the terminal devices may be performed over a spectrum below 6 GHz, or a spectrum above 6 GHz, or both a spectrum below 6 GHz and a spectrum above 6 GHz. Spectrum resources used between the access network device and the terminal device are not limited in embodiments of this application.

Figure 2:
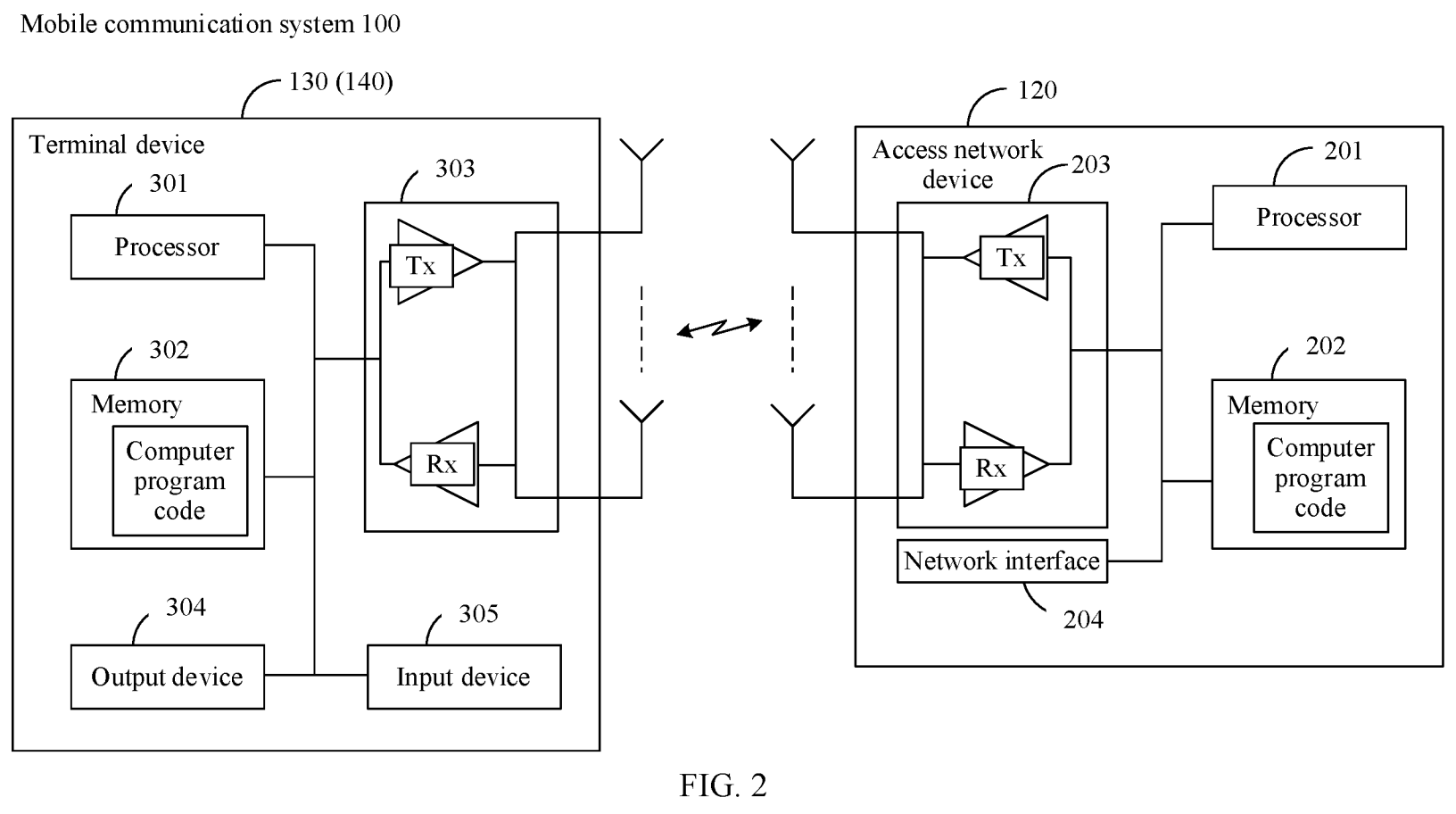

FIG. 2 is a schematic diagram of hardware structures of an access network device and a terminal device according to an embodiment of this application.

The terminal device 130 (140) includes at least one processor 301, at least one memory 302, and at least one transceiver 303. Optionally, the terminal device 130 may further include an output device 304 and an input device 305.

The processor 301, the memory 302, and the transceiver 303 are connected through a bus. The processor 301 may be a general-purpose central processing unit (CPU), a microprocessor, an application-specific integrated circuit (ASIC), or one or more integrated circuits configured to control program execution in the solutions of this application. The processor 301 may alternatively include a plurality of CPUs, and the processor 301 may be a single-core (single-CPU) processor or a multi-core (multi-CPU) processor. The processor herein may be one or more devices, circuits, or processing cores configured to process data (for example, computer program instructions).

The memory 302 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM), or another compact disc storage, an optical disc storage (including a compact disc, a laser disc, an optical disc, a digital versatile disc, and a Blu-ray disc, or the like), a disk storage medium or another disk storage device, or any other medium that can be used to carry or store expected program code in an instruction or data structure form and that can be accessed by a computer; but is not limited thereto. The memory 302 may exist independently, and is connected to the processor 301 through the bus. The memory 302 may alternatively be integrated with the processor 301. The memory 302 is configured to store application program code for executing the solutions of this application, and the processor 301 controls the execution. The processor 301 is configured to execute computer program code stored in the memory 302, to implement the coordinated transmission method in embodiments of this application.

The transceiver 303 may be any type of apparatus such as a transceiver, and is configured to communicate with another device or a communication network such as an Ethernet, a radio access network (RAN), or a wireless local area network (WLAN). The transceiver 303 includes a transmitter Tx and a receiver Rx.

The output device 304 communicates with the processor 301, and may display information in a plurality of manners. For example, the output device 304 may be a liquid crystal display (LCD), a light emitting diode (LED) display device, a cathode ray tube (CRT) display device, a projector, or the like. The input device 305 communicates with the processor 301, and may receive input of a user in a plurality of manners. For example, the input device 305 may be a mouse, a keyboard, a touchscreen device, or a sensing device.

The access network device 120 includes at least one processor 201, at least one memory 202, at least one transceiver 203, and at least one network interface 204. The processor 201, the memory 202, the transceiver 203, and the network interface 204 are connected through a bus. The network interface 204 is configured to connect to a core network device through a link (for example, an S1 interface), or connect to a network interface of another access network device through a wired or wireless link (for example, an X2 interface) (not shown in the figure). This is not specifically limited in embodiments of this application. In addition, for related descriptions of the processor 201, the memory 202, and the transceiver 203, refer to the descriptions of the processor 301, the memory 302, and the transceiver 303 in the terminal device 130. Details are not described herein again.

To make this application clearer, some concepts in this application are first briefly described.

1. K0 and Minimum K0

Cross-slot scheduling is proposed in the 3rd generation mobile communication standardization partnership project standard release 16 to reduce power consumption of terminal devices. Downlink is used as an example. An access network device schedules a physical downlink shared channel (PDSCH) to a terminal device through a physical downlink control channel (PDCCH). A slot offset between the PDCCH and the scheduled PDSCH is K0.

K0=0 indicates that the PDCCH and the scheduled PDSCH are in a same slot.

K0>0 indicates that the PDCCH and the scheduled PDSCH are not in a same slot.

Minimum K0 means a minimum available slot offset of the PDSCH during cross-slot scheduling, that is, a smallest available K0 in slot offset values between the PDCCH and the scheduled PDSCH.

It is to be noted herein that, the slot is actually an LTE subframe in the case of an LTE system, the slot is an NR slot in the case of an NR system.

The access network device schedules the PDSCH to the terminal device through the PDCCH during downlink data transmission. The terminal device periodically monitors the PDCCH for scheduling the PDSCH. When minimum K0>0, the terminal device only needs to monitor the PDCCH, and does not need to buffer a possible PDSCH in the slot. This reduces power consumption of the terminal device. If the terminal device detects that the PDCCH schedules the PDSCH, the terminal device receives the PDSCH in the slot of K0 indicated by the PDCCH.

2. Bandwidth Part (BWP) and BWP Switching 2.1. Basic Concepts of BWP

The concept of a bandwidth part (BWP) is introduced in new radio (NR). A BWP is a segment of contiguous frequency resources on a carrier.

There are states of a BWP: an active state and an inactive state. The active state means an operating state. That the BWP is in the active state means that the BWP is in the operating state, or may be described as "an active BWP". For example, the BWP may receive or send a signal. The inactive state, opposite to the active state, may be a non-operating state. That the BWP is in the inactive state means that the BWP is in the non-operating state, or the BWP may be described as "an inactive BWP" or "a deactivated BWP". A process of switching a BWP from the inactive state to the active state or switching a BWP in the non-operating state to the BWP in the operating state is activation of the BWP. Correspondingly, a process of switching a BWP from the active state to the inactive state or switching a BWP in the operating state to the BWP in the non-operating state is deactivation of the BWP, or may be described as deactivating a BWP.

BWPs may be classified into a downlink BWP and an uplink BWP. An access network device may configure a plurality of DL BWPs and a plurality of UL BWPs for a terminal device, and activate at least one DL BWP and at least one UL BWP. The terminal device receives, on the active DL BWP, downlink transmission sent by the access network device. The terminal device sends uplink transmission on the active UL BWP. The uplink transmission includes but is not limited to uplink control signaling transmission, uplink data transmission, and uplink reference signal transmission. Uplink control signaling includes a positive acknowledgment (acknowledge, ACK)/negative acknowledgment, a scheduling request (SR), and channel state information (CSI). An uplink reference signal includes a demodulation reference signal (DMRS), a phase tracking reference channel (PTRS), a sounding reference signal (SRS), and the like.

2.2. BWP Switching

To enable a terminal device to receive or send data on different BWPs at different moments depending on service requirements, NR supports to trigger, by using DCI for scheduling data, the terminal device to perform BWP switching.

BWP switching is for switching an active BWP. In an existing standard, when the terminal device operates in a cell, there is only one active downlink BWP (DL BWP) and one active uplink BWP (UL BWP). However, the active BWP may be changed, which is called "BWP switching". For example, an access network device configures two DL BWPs for the terminal device: a DL BWP 1 and a DL BWP 2. Downlink scheduling DCI format 1_1 or DCI format 1_2 may carry a BWP switching indication. The access network device may send downlink scheduling DCI format 1_1 or DCI format 1_2 to the terminal device, where the scheduling DCI is carried on a physical downlink control channel PDCCH and is transmitted through the PDCCH. The terminal device receives the scheduling DCI, and switches to a DL BWP indicated by the scheduling DCI to receive or send data.

However, a specific processing delay is required for the terminal device to switch from one BWP to another BWP, and the processing delay is referred to as $T_{BWPswitchDelay}$. This value is defined as follows:

If the terminal device receives, in slot n, the scheduling DCI for BWP switching, the terminal device should have a capability of sending a PUSCH or receiving a PDSCH in an $n+T_{BWPswitchDelay}{}^{th}$ slot on a BWP to be switched to. NR defines two types of processing delay based on different capabilities of the terminal device, as shown in Table 1.

TABLE 1

| | NR duration | | $T_{BWPswitchDelay}$ (slots) | |
|---|---|---|---|---|
| μ | (ms) | | Type 1 | Type 2 |
| 0 | 1 | | 1 | 3 |
| 1 | 0.5 | | 2 | 5 |
| 2 | 0.25 | | 3 | 9 |
| 3 | 0.125 | | 6 | 17 |

μ is a parameter of subcarrier spacing at which the terminal device operates, that is, the subcarrier spacing at which the terminal device operates is $2^{\mu} \cdot 15$ kHz. The terminal device may report (for example, UE) to the access network device (for example, gNB) a supported BWP switching capability being the type 1 or the type 2.

3. Search Space 3.1. Basic Concepts of the Search Space

A PDCCH in NR may include L={1, 2, 4, 8, 16} control channel elements (CCEs), where L is referred to as an aggregation level (AL) of the PDCCH. One CCE includes six resource element groups (REGs), and each REG corresponds to one RB on one OFDM symbol.

One PDCCH candidate may include L={1, 2, 4, 8, 16} control channel elements, and a PDCCH of a terminal device may be sent, or not be sent on the PDCCH candidate. The terminal device may detect the PDCCH candidate, to determine whether the PDCCH of the terminal device exists.

An access network device configures one or more search spaces for the terminal device (or referred to as a search space, which may be expressed by using the search space). The search space includes a plurality of PDCCH candidates, one PDCCH candidate may carry one PDCCH, and the terminal device performs blind detection a PDCCH on the PDCCH candidate.

3.2. Search Space Configuration

The search space configuration is as follows:

searchSpaceId: an identity of a search space;

controlResourceSetId: an identity of a CORESET applicable for the search space, for determining a time-frequency position of the search space;

monitoringSlotPeriodicityAndOffset: a period and an offset of the search space, for determining a time domain position of the search space;

nrofCandidates: a quantity of PDCCH candidates per AL; and searchSpaceType: a type of the search space, where there are two types of search space sets: a common search space (CSS) and a UE-specific search space (USS).

3.3. Search Space Configuration During Cross-Carrier Scheduling

The search space configuration during cross-carrier scheduling supported by NR is as follows:

nrofCandidates: a quantity of ALs and PDCCH candidates in an associated scheduled carrier; and searchSpaceId: an identity of the search space (in cross-carrier scheduling, search spaces with the same searchSpaceId in the scheduling cell and the scheduled cell are associated with each other).

3.4. Search Space Group Switching

In a serving cell, a higher layer parameter searchSpace-GroupIdList-r16 may configure an identity of a search space group for a terminal device. An identity of each search space group corresponds to a group of Type3-PDCCH CSS sets or USSs (other CSS sets are always monitored).

A higher layer parameter searchSpaceSwitchingDelay-r16 may configure a switching capability $P_{switch}$ for a terminal device, and a minimum value of the $P_{switch}$ is shown in Table 2. In the current protocol, a minimum value of the high-level parameter searchSpaceGroupIdList-r16 is 10 and a maximum value is 52. A terminal device may report a switching capability 1 or a switching capability 2 supported by the terminal device. If no capability is reported, the terminal device supports the switching capability 1 by default.

TABLE 2

| μ | Switching capability 1 [symbol] | Switching capability 2 [symbol] |
|---|---|---|
| 0 | 25 | 10 |
| 1 | 25 | 12 |
| 2 | 25 | 22 |

μ is a parameter of subcarrier spacing at which the terminal device operates, that is, the subcarrier spacing at which the terminal device operates is $2^{\mu} \cdot 15$ kHz. A higher-layer parameter searchSpaceSwitchingTimer-r16 may con-figure a timer value for a terminal device. The timer value is decreased by 1 for a slot corresponding to each reference SCS μ. When the timer value is decreased to 0, the terminal device starts to monitor a PDCCH on a default search space set.

When a higher layer parameter SearchSpaceSwitchTrigger-r16 is configured or not configured for the terminal device, an implementation in which the terminal device switches the PDCCH on the search space set for monitoring may be as follows:

First, if a position of a search space set group switching indication field in DCI format 2_0 is configured for the terminal device by using the higher layer parameter SearchSpaceSwitchTrigger-r16, a manner of switching a search space set group, indicated by DCI format 2_0 may be as follows:

If a value of the search space set group switching indication field in DCI format 2_0 is 0, in the serving cell, in the first slot after slots to which a symbol of the PDCCH carrying DCI format 2_0 and a symbol of the switching capability $P_{switch}$ belong, the terminal device starts to monitor a PDCCH in a search space set group whose identity of the search space group is 0, and stops monitoring a PDCCH in a search space set group whose identity of the search space group is 1.

Alternatively, if a value of the search space set group switching indication field in DCI format 2_0 is 1, in the serving cell, in the first slot after slots to which a symbol of the PDCCH carrying DCI format 2_0 and a symbol of the switching capability $P_{switch}$ belong, the terminal device starts to monitor a PDCCH in a search space set group whose identity of the search space group is 1, and stops monitoring a PDCCH in a search space set group whose identity of the search space group is 0. In addition, the terminal device sets the timer value to searchSpaceSwitchingTimer-r16.

In a serving cell, the terminal device is monitoring a PDCCH in a search space set group whose identity of the search space group is 1. If the timer expires in a slot, in the first slot after the slot to which the $P_{switch}$ symbol belongs, the terminal device starts to monitor a PDCCH in a search space set group whose identity of the search space group is 0, and stops monitoring the PDCCH in the search space set group whose identity of the search space group is 1.

Second, for a serving cell, if a terminal device is not configured with the higher layer parameter searchSpaceSwitchTrigger-r16, a manner of switching a search space set group is as follows:

If the terminal device detects a PDCCH in a search space set group whose identity of the search space group is 0, in the serving cell, and in the first slot after a slot to which a symbol of the PDCCH carrying the DCI format and a symbol of a switching capability $P_{switch}$ belong, the terminal device starts to monitor a PDCCH in a search space set group whose identity of the search space group is 1, and stops monitoring a PDCCH in a search space set group whose identity of the search space group is 0.

In a serving cell, the terminal device is monitoring a PDCCH in a search space set group whose identity of the search space group is 1. If the timer expires in a slot, in the first slot after the slot to which the $P_{switch}$ symbol belongs, the terminal device starts to monitor a PDCCH in a search space set group whose identity of the search space group is 0, and stops monitoring the PDCCH in the search space set group whose identity of the search space group is 1.

4. Carrier Aggregation and Activation/Deactivation of Secondary Component Carrier 4.1. Dual Connectivity and Carrier Aggregation In dual connectivity (DC), a terminal device establishes links to a plurality of cells, and these cells are classified into two groups: a master cell group (MCG) and a secondary cell group (SCG). If dual connectivity is not performed, a group of cells communicating with the terminal device is an MCG.

A plurality of cells in the MCG are combined by using a carrier aggregation (CA) technology. A plurality of cells in the SCG are combined by using a carrier aggregation (CA) technology.

A primary cell of the MCG is a primary cell (PCell), a primary cell of the SCG is a primary secondary cell (PS-Cell), and other cells in the MCG and the SCG are secondary cells (SCells).

4.2. Carrier Activation and Deactivation 4.2.1 Activation/Deactivation State of an SCell 1. Activation of an SCell includes the following operations:

A terminal device sends a sounding reference signal (SRS) to an access network device.

The terminal device reports channel state information (CSI) of the SCell.

The terminal device detects a PDCCH that is used in the SCell and that is transmitted in the SCell.

If the access network device configures a PUCCH that is transmitted on the carrier for the terminal device, the access network device sends the PUCCH to the terminal device.

The terminal device starts or restarts an sCellDeactivationTimer (an SCell deactivation timer), to trigger the terminal device to report a PHR.

2. When a MAC entity of the terminal device receives a command for deactivating an SCell or the sCellDeactivationTimer of the SCell expires, the SCell is deactivated, the sCellDeactivationTimer of the SCell is stopped, or all HARQ buffers (hybrid automatic repeat request buffers) in the SCell are refreshed (cleared).

3. If an SCell is deactivated, the terminal device does not send an SRS in the corresponding SCell, does not report the CSI of the SCell, does not transmit uplink data, does not detect the PDCCH that is used in the SCell and that is transmitted in the SCell, and does not transmit the PUCCH.

4.2.2 SCell Activation/Deactivation Indication

The access network device sends an activation/deactivation MAC CE to the terminal device. The terminal device determines the active state and the deactive state of the SCell based on information in the MAC CE.

For the activated SCell determined by using the MAC CE, the terminal device may further deactivate the SCell by using the timer.

The terminal device maintains a deactivation timer sCell-DeactivationTimer for each SCell, and all SCells of a specific terminal device correspond to same values of sCell-DeactivationTimer. Further, the value may be set to "infinity", that is, timer-based SCell deactivation is disabled. In this case, the terminal device cannot control SCell deactivation.

For an SCell, when the terminal device receives no data or PDCCH message in the SCell within time specified by the deactivation timer, the SCell is deactivated. This is the only case in which the terminal device automatically deactivates a specific SCell.

4.2.3 Activating/Deactivating Valid Time

If receiving in a PDSCH an activation command for an SCell ending in slot n, the terminal device activates the SCell no earlier than slot n+k and no later than the minimum requirement defined in TS 38.133.

The value of k is $k_1+3\cdot N_{slot}^{subframe,\mu}+1$, where $k_1$ indicates a transmission slot number of a PUCCH with HARQ-ACK information for PDSCH reception, and is indicated by a PDSCH-to-HARQ-timing-indicator field in DCI for scheduling the PDSCH. $N_{slot}^{subframe,\mu}$ is a quantity of slots per subframe for the SCS configuration $\mu$ of the PUCCH.

If the sCellDeactivationTimer associated with the SCell expires in slot n, the terminal device deactivates the SCell no later than the minimum requirement defined in TS 38.133.

In conclusion, when an SCell is activated, the terminal device starts, no earlier than slot n+kl and no later than the minimum requirement defined in TS 38.133, to detect the PDCCH that is used in the SCell and that is transmitted in the SCell. When an SCell is deactivated, the terminal device does not start, no earlier than slot n and no later than the minimum requirement defined in TS 38.133, to detect the PDCCH that is used in the SCell and that is transmitted in the SCell.

5. Carrier Dormancy 5.1. Carrier Dormancy/Non-Dormancy Indication

The 3GPP release 16 introduces a carrier dormancy mechanism for an SCell. Switching between dormancy behavior and non-dormancy behavior for the SCell is implemented through BWP switching. When a specific SCell is indicated as dormancy, a terminal device switches from a currently active downlink BWP to a dormant BWP in the SCell, and the terminal device does not need to detect PDCCH on the dormant BWP. Alternatively, when the SCell is a scheduled carrier in cross-carrier scheduling, the terminal device does not need to detect a PDCCH for scheduling the SCell on the corresponding scheduled carrier.

Switching between dormancy and non-dormancy of the SCell is indicated by DCI in the following manners:

Manner 1: An SCell dormancy indication field in DCI format 0_1 or 1_1 indicates whether the SCell is dormancy or non-dormancy, and the DCI may schedule data at the same time. A network is configured with a maximum of five SCell groups by using a parameter SCell-groups-for-dormancy-within-active-time. The SCell dormancy indication has a maximum of 5 bits, and each bit corresponds to one of the SCell groups. When the bit indicates '0', a BWP in each activated SCell in the corresponding SCell group is switched to a dormant BWP. When the bit indicates '1', if the terminal device is on a non-dormant BWP in each activated SCell in a corresponding SCell group, the terminal device continues to operate on the non-dormant BWP; or if the terminal device is on a dormant BWP, the terminal device switches to the first non-dormant BWP.

Manner 2: A specific field in DCI format 1_1 indicates whether the SCell is dormancy or non-dormancy, and DCI may not schedule data at the same time. In this indication method, each bit corresponds to one SCell, and indicates whether each SCell is dormancy or non-dormancy.

Manner 3: An SCell dormancy indication field in DCI format 2_6 indicates whether the SCell is dormancy or non-dormancy. The indication manner is basically similar to Manner 1. A difference lies in that DCI format 2_6 is group common DCI, and may be sent to a plurality of terminal devices without data scheduling.

5.2. Valid Time of Carrier Dormancy

Because switching between dormancy and non-dormancy of an SCell is BWP switching, the valid time of switching between dormancy and non-dormancy is the same as that of BWP switching.

The foregoing briefly describes some concepts related to embodiments of this application.

Currently, in the 5G technical standard release 16, cross-carrier scheduling means that one carrier schedules another carrier. For example, a carrier of a primary cell PCell schedules a carrier of a secondary cell SCell, or a carrier of a secondary cell SCell schedules a carrier of another secondary cell SCell. To relieve a control channel payload on the primary cell PCell, the carrier of the secondary cell SCell can schedule the carrier of the primary cell PCell.

For ease of implementation, it is possible that only one of the SCell and the PCell may have an effective USS for scheduling the PCell. Control channel payloads on the PCell and SCell vary with time. At one moment, the control channel payload on the PCell may be higher than that of the SCell, and at the next moment, the control channel payload of the SCell is higher than that of the PCell. Based on changes in the control channel payloads of the PCell and SCell, a cell with a light payload may be selected to transmit a control channel. Therefore, how to efficiently switch between USSs on bandwidth parts (BWPs) of two cells becomes an urgent problem to be resolved.

To implement efficient switching between USSs on BWPs of two cells, embodiments of this application provide a cross-carrier scheduling method. In the method, a terminal device receives first indication information when monitoring, in at least one USS in a first cell, a PDCCH for scheduling data of a third cell. The terminal device stops, based on the first indication information, monitoring, in the at least one USS in the first cell, the PDCCH for scheduling the data of the third cell, or determines to monitor, in at least one USS in a second cell, a PDCCH for scheduling the data of the third cell.

Methods in the following embodiments may be applied to devices (the terminal device 130 and the terminal device 140 in FIG. 1) having the foregoing hardware structure.

Figure 3:
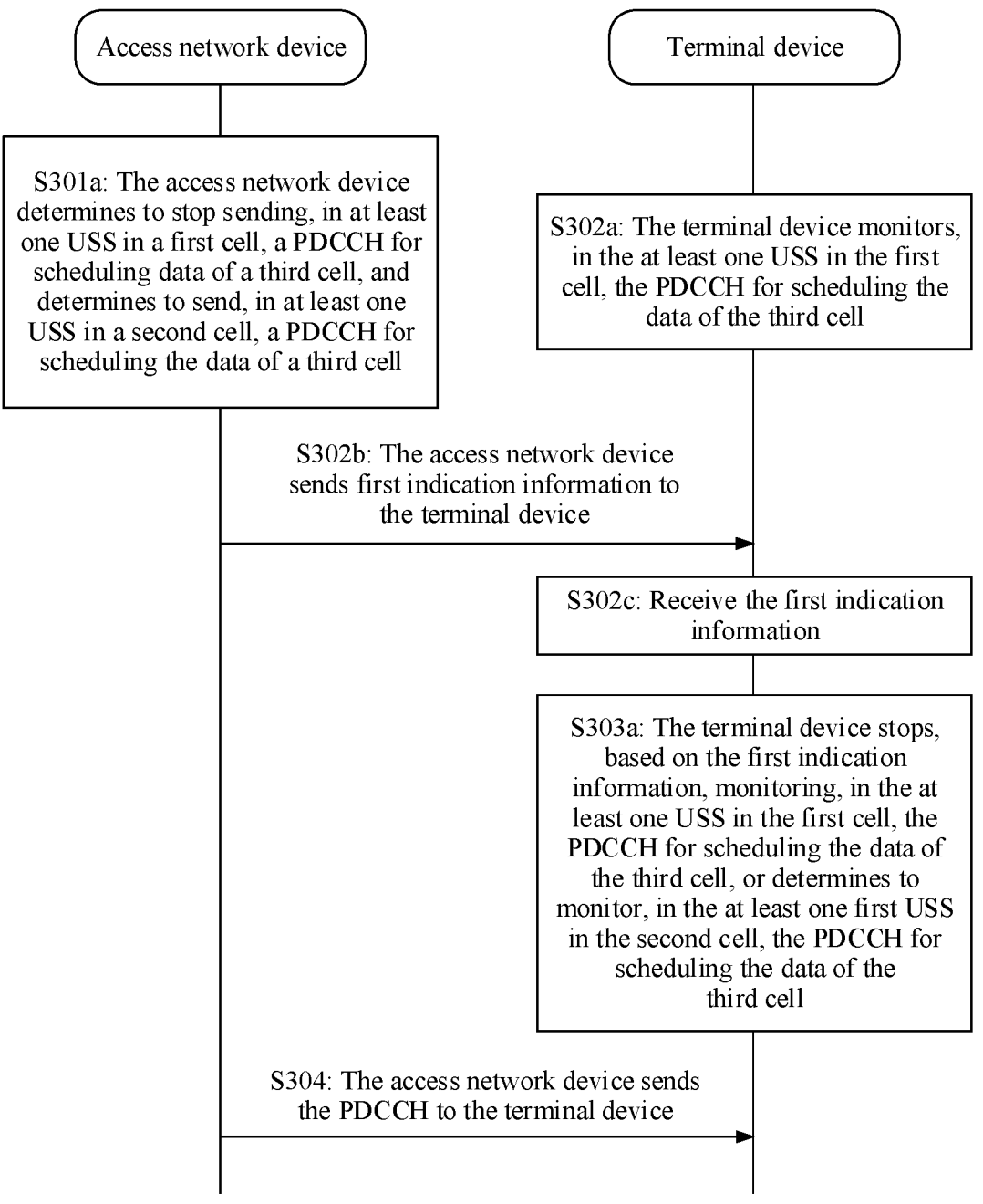
FIG. 3 is a flowchart of a cross-carrier scheduling method according to an embodiment of this application.

FIG. 3 is a schematic flowchart of a cross-carrier scheduling method according to an embodiment of this application. As shown in FIG. 3, the method may include the following steps.

S301a: An access network device determines to stop sending, in at least one USS in a first cell, a PDCCH for scheduling data of a third cell, and determines to send, in at least one USS in a second cell, a PDCCH for scheduling the data of a third cell.

A cell is a logical area that provides a service for users. Each cell corresponds to one carrier.

The first cell may be a primary cell PCell, and the second cell may be a secondary cell SCell; or the first cell may be a secondary cell SCell, and the second cell may be a primary cell PCell; or the first cell may be a secondary cell SCell, and the second cell may be another secondary cell SCell.

Different types of the first cell correspond to different indication content in first indication information.

For example, if the first cell is a PCell, the first indication information for the first cell includes an indication for switching a BWP or an indication for switching a search space set. If the first cell is an SCell, the first indication information for the first cell may include one or more of an indication for activating/deactivating the SCell, an indication for switching a BWP, an indication for switching a search space set, an indication of a dormancy cell, and an indication of a non-dormancy cell. Certainly, the first indication information may further include other indications, which are not listed one by one herein.

Because at least one USS that includes a PDCCH candidate capable of carrying a PDCCH for scheduling data of the first cell may be configured on a configured BWP in the primary cell PCell, at least one USS that includes a PDCCH candidate capable of carrying a PDCCH for scheduling the data of the first cell may also be configured on a configured BWP in the secondary cell SCell. However, a USS, in only one of the primary cell PCell and the secondary cell SCell, that includes a PDCCH candidate capable of carrying a PDCCH for scheduling the data of the first cell is in an operating state.

Therefore, S301a is specifically as follows: The access network device determines, based on the first indication information, to send, in the at least one USS in the PCell, the PDCCH for scheduling the data of the third cell, and determines to stop sending, in the at least one USS in the SCell, the PDCCH for scheduling the data of the third cell.

Certainly, the step may alternatively be as follows: The access network device determines, based on the first indication information, to send, in the at least one USS in the SCell, the PDCCH for scheduling the data of the third cell, and determines to stop sending, in the at least one USS in the PCell, the PDCCH for scheduling the data of the third cell.

S302b: The access network device sends the first indication information to a terminal device.

S302a: The terminal device monitors, in the at least one USS in the first cell, the PDCCH for scheduling the data of the third cell.

S302c: The terminal device receives the first indication information.

It is to be noted herein that the terminal device receives the first indication information in a status of monitoring, in the at least one USS in the first cell, the PDCCH for scheduling the data of the third cell. In other words, before the terminal device receives the first indication information, the terminal device performs S302a; or when the terminal device receives the first indication information, the terminal device performs S302a. This is not specifically limited in this embodiment of this application.

As described above, the first cell may be a primary cell PCell, and the second cell may be a secondary cell SCell; or the first cell may be a secondary cell SCell, and the second cell may be a primary cell PCell; or the first cell may be a secondary cell SCell, and the second cell may be another secondary cell SCell.

The first indication information is for determining to stop monitoring, in the at least one USS in the first cell, the PDCCH for scheduling the data of the third cell, or determining to monitor, in the at least one USS in the second cell, the PDCCH for scheduling the data of the third cell.

Different types of the first cell correspond to different content in first indication information. Specifically, the following cases are included:

Case 1: The first cell is a secondary cell SCell, and the second cell is a primary cell PCell.

The first indication information includes at least one of the following indications:

an indication for deactivating the SCell;

an indication for switching a BWP in the SCell, where the indication for switching the BWP indicates that no first USS exists on a BWP to be switched to, and the first USS is a USS that includes a PDCCH candidate capable of carrying a PDCCH for scheduling the data of the third cell;

an indication for configuring the SCell to a dormancy cell; and an indication for switching a search space set in the SCell, where the indication for switching the search space set indicates that no first USS exists in a search space set to be switched to.

Case 2: The first cell is a secondary cell SCell, and the second cell is a primary cell PCell.

The first indication information includes at least one of the following indications:

an indication for switching a BWP in the PCell, where the indication for switching the BWP indicates that a first USS exists on a BWP to be switched to, and the first USS is a USS that includes a PDCCH candidate capable of carrying a PDCCH for scheduling the data of the third cell; and an indication for switching a search space set in the PCell, where the indication for switching the search space set indicates that the first USS exists in a search space set to be switched to.

Case 3: The first cell is a primary cell PCell, and the second cell is a secondary cell SCell.

The first indication information includes at least one of the following indications:

an indication for activating the SCell;

an indication for switching a BWP in the SCell, where the indication for switching the BWP indicates that a first USS exists on a BWP to be switched to, and the first USS is a USS that includes a PDCCH candidate capable of carrying a PDCCH for scheduling the data of the third cell;

an indication for configuring the SCell to a non-dormancy cell; and an indication for switching a search space set in the SCell, where the indication for switching the search space set indicates that the first USS exists in a search space set to be switched to.

Case 4: The first cell is a primary cell PCell, and the second cell is a secondary cell SCell.

The first indication information includes at least one of the following indications:

an indication for switching a BWP in the PCell, where the indication for switching the BWP indicates that no first USS exists on a BWP to be switched to, and the first USS is a USS that includes a PDCCH candidate capable of carrying a PDCCH for scheduling the data of the third cell; and an indication for switching a search space set in the PCell, where the indication for switching the search space set indicates that no first USS exists in a search space set to be switched to.

Case 5: The first cell is a first secondary cell SCell, and the second cell is a second secondary cell SCell.

The first indication information includes at least one of the following indications:

an indication for activating the second SCell;

an indication for switching a BWP in the second SCell, where the indication for switching the BWP indicates that a first USS exists on a BWP to be switched to, and the first USS is a USS that includes a PDCCH candidate capable of carrying a PDCCH for scheduling the data of the third cell;

an indication for configuring the second SCell to a non-dormancy cell; and an indication for switching a search space set in the second SCell, where the indication for switching the search space set indicates that the first USS exists in a search space set to be switched to.

Case 6: The first cell is a first secondary cell SCell, and the second cell is a second secondary cell SCell.

an indication for deactivating the first SCell;

an indication for switching a BWP in the first SCell, where the indication for switching the BWP indicates that no first USS exists on a BWP to be switched to, and the first USS is a USS that includes a PDCCH candidate capable of carrying a PDCCH for scheduling the data of the third cell;

an indication for configuring the first SCell to a non-dormancy cell; and an indication for switching a search space set in the first SCell, where the indication for switching the search space set indicates that no first USS exists in a search space set to be switched to.

S303a: The terminal device stops, based on the first indication information, monitoring, in the at least one USS in the first cell, the PDCCH for scheduling the data of the third cell, or determines to monitor, in the at least one first USS in the second cell, the PDCCH for scheduling the data of the third cell.

In a specific implementation, for different types of the first cell and different indication content included in the first indication information, scenarios are provided below.

Scenario a1: The first cell is a secondary cell SCell, the second cell is a primary cell PCell, the third cell is a primary cell PCell or a secondary cell SCell, and the first indication information includes an indication for deactivating the SCell.

The terminal device deactivates the SCell based on the indication for deactivating the SCell, stops a deactivation timer sCellDeactivationTimer of the SCell, or refreshes or clears all hybrid automatic repeat request buffers HARQ buffers of the SCell. In this case, the terminal device determines to monitor, in the at least one first USS in the PCell, the PDCCH for scheduling the data of the third cell.

Scenario a2: The first cell is a secondary cell SCell, the second cell is a primary cell PCell, the third cell is a primary cell PCell or a secondary cell SCell, the first indication information is carried in DCI, and the first indication information includes an indication for switching a BWP in the SCell.

The terminal device switches to a BWP to be switched to based on the indication for switching the BWP in the SCell, where no first USS exists on the BWP to be switched to, and the first USS is a USS that includes a PDCCH candidate capable of carrying a PDCCH for scheduling the data of the third cell. In this case, the terminal device determines to monitor, in the at least one first USS in the PCell, the PDCCH for scheduling the data of the third cell.

Scenario a3: The first cell is a secondary cell SCell, the second cell is a primary cell PCell, the third cell is a primary cell PCell or a secondary cell SCell, the first indication information is carried in DCI, and the first indication information includes an indication for configuring the SCell to a dormancy cell.

The terminal device indicates, based on an SCell dormancy indication field in DCI format 0_1 or 1_1, that the SCell is the dormancy cell, and switches an active BWP in the SCell to a dormant BWP, where no first USS exists on the dormant BWP, and the first USS is a USS that includes a PDCCH candidate capable of carrying a PDCCH for scheduling the data of the third cell. In this case, the terminal device determines to monitor, in the at least one first USS in the PCell, the PDCCH for scheduling the data of the third cell, and determines to stop monitoring, in the at least one USS in the first SCell, the PDCCH for scheduling the data of the third cell.

Alternatively, the access network device configures a maximum of five SCell groups by using a parameter SCell-groups-for-dormancy-within-active-time. The SCell dormancy indication has a maximum of 5 bits, and each bit corresponds to one of the SCell groups. The terminal device switches a BWP in each activated SCell in a corresponding SCell group to a dormant BWP based on the bit indication '0', where no first USS exists on the dormant BWP, and the first USS is a USS that includes a PDCCH candidate capable of carrying a PDCCH for scheduling the data of the third cell. In this case, the terminal device determines to monitor, in the at least one first USS in the PCell, the PDCCH for scheduling the data of the third cell, and determines to stop monitoring, in the at least one USS in the first SCell, the PDCCH for scheduling the data of the third cell.

Alternatively, the terminal device switches, based on a specific field in DCI format 1_1 indicating the SCell is the dormancy cell, an active BWP in the SCell to a dormant BWP, where no first USS exists on the dormant BWP, and the first USS is a USS that includes a PDCCH candidate capable of carrying a PDCCH for scheduling the data of the third cell. In this case, the terminal device determines to monitor, in the at least one first USS in the PCell, the PDCCH for scheduling the data of the third cell, and determines to stop monitoring, in the at least one USS in the first SCell, the PDCCH for scheduling the data of the third cell.

Alternatively, the terminal device switches, based on an SCell dormancy indication field in DCI format 2_6 indicating that the SCell is the dormancy cell, an active BWP in the SCell to a dormant BWP, where no first USS exists on the dormant BWP, and the first USS is a USS that includes a PDCCH candidate capable of carrying a PDCCH for scheduling the data of the third cell. In this case, the terminal device determines to monitor, in the at least one first USS in the PCell, the PDCCH for scheduling the data of the third cell, and determines to stop monitoring, in the at least one USS in the first SCell, the PDCCH for scheduling the data of the third cell.

Scenario a4: The first cell is a secondary cell SCell, the second cell is a primary cell PCell, the third cell is a primary cell PCell or a secondary cell SCell, the first indication information is carried in DCI, and the first indication information includes an indication for switching a search space set in the SCell.

The terminal device receives DCI format 2_0 indicating search space set switching in the SCell, where the indication for switching the search space set indicates that a first USS exists in a search space set to be switched to. In the first slot after a slot to which a symbol carrying the PDCCH of DCI format 2_0 and a symbol of a switching capability $P_{switch}$ belong, the terminal device determines to monitor, in the at least one first USS in the PCell, the PDCCH for scheduling the data of the third cell, and stops monitoring, in the at least one USS in the SCell, the PDCCH for scheduling the data of the third cell.

Alternatively, the terminal device monitors, in the at least one first USS in the SCell, the PDCCH for scheduling the data of the third cell, and when the timer expires in a current slot, the terminal device is in the first slot after the current slot to which a symbol of the PDCCH belongs. The terminal device determines to monitor, in the at least one first USS in the PCell, the PDCCH for scheduling the data of the third cell, and stops monitoring, in the at least one USS in the SCell, the PDCCH for scheduling the data of the third cell.

Alternatively, the terminal device monitors, on the USS whose identity is 1 of the search space group, the PDCCH for scheduling the data of the third cell. In the SCell, and in the first slot after a slot to which a symbol carrying a PDCCH of the DCI format and a symbol of a switching capability $P_{switch}$ belong, the terminal device determines to monitor, in at least one first USS in the PCell, the PDCCH for scheduling the data of the third cell, and stops monitoring, in at least one USS in the SCell, the PDCCH for scheduling the data of the third cell.

Scenario a5: The first cell is a secondary cell SCell, the second cell is a primary cell PCell, the third cell is a primary cell PCell or a secondary cell SCell, and the first indication information includes an indication for switching a BWP in the PCell.

The terminal device switches to a BWP to be switched to based on the indication for switching the BWP in the PCell, where a first USS exists on the BWP to be switched to, and the first USS is a USS that includes a PDCCH candidate capable of carrying a PDCCH for scheduling the data of the third cell. In this case, the terminal device determines to monitor, in the at least one USS in the PCell, the PDCCH for scheduling the data of the third cell, and determines to stop monitoring, in the at least one first USS in the SCell, the PDCCH for scheduling the data of the third cell.

Scenario a6: The first cell is a secondary cell SCell, the second cell is a primary cell PCell, the third cell is a primary cell PCell or a secondary cell SCell, and the first indication information includes an indication for switching a search space set in the PCell.

The terminal device switches to a BWP to be switched to based on the indication for switching the search space set in the PCell, where a first USS exists on the BWP to be switched to, and the first USS is a USS that includes a PDCCH candidate capable of carrying a PDCCH for scheduling the data of the third cell. In this case, the terminal device determines to monitor, in the at least one USS in the PCell, the PDCCH for scheduling the data of the third cell, and determines to stop monitoring, in the at least one first USS in the SCell, the PDCCH for scheduling the data of the third cell.

Scenario b1: The first cell is a primary cell PCell, the second cell is a secondary cell SCell, the third cell is a primary cell PCell or a secondary cell SCell, and the first indication information includes an indication for activating the SCell.

The terminal device activates the SCell based on the indication for activating the SCell. In this case, the terminal device determines to monitor, in the at least one first USS in the SCell, the PDCCH for scheduling the data of the third cell, and determines to stop monitoring, in the at least one USS in the PCell, the PDCCH for scheduling the data of the third cell.

Scenario b2: The first cell is a primary cell PCell, the second cell is a secondary cell SCell, the third cell is a primary cell PCell or a secondary cell SCell, the first indication information is carried in DCI, and the first indication information includes an indication for switching a BWP in the SCell.

The terminal device switches to a BWP to be switched to based on the indication for switching the BWP in the SCell, where a first USS exists on the BWP to be switched to, and the first USS is a USS that includes a PDCCH candidate capable of carrying a PDCCH for scheduling the data of the third cell. In this case, the terminal device determines to monitor, in the at least one first USS in the SCell, the PDCCH for scheduling the data of the third cell, and determines to stop monitoring, in the at least one USS in the PCell, the PDCCH for scheduling the data of the third cell.

Scenario b3: The first cell is a primary cell PCell, the second cell is a secondary cell SCell, the third cell is a primary cell PCell or a secondary cell SCell, the first indication information is carried in DCI, and the first indication information includes an indication for configuring the SCell to a non-dormancy cell.

The terminal device switches, based on an SCell dormancy indication field in DCI format 0_1 or 1_1 indicating that the SCell is the non-dormancy cell, a dormant BWP in the SCell to the non-dormancy BWP, where a first USS exists on the non-dormancy BWP, and the first USS is a USS that includes a PDCCH candidate capable of carrying a PDCCH for scheduling the data of the third cell. In this case, the terminal device determines to monitor, in the at least one USS in the SCell, the PDCCH for scheduling the data of the third cell.

Alternatively, the access network device configures a maximum of five SCell groups by using a parameter SCell-groups-for-dormancy-within-active-time. The SCell dormancy indication has a maximum of 5 bits, and each bit corresponds to one of the SCell groups. The terminal device switches the dormancy BWP in each SCell in a corresponding SCell group to a non-dormancy BWP based on the bit indication '1', where a first USS exists on the non-dormancy BWP, and the first USS is a USS that includes a PDCCH candidate capable of carrying a PDCCH for scheduling the data of the third cell. In this case, the terminal device determines to monitor, in the at least one USS in the SCell, the PDCCH for scheduling the data of the third cell.

Alternatively, the terminal device switches, based on a specific field in DCI format 1_1 indicating that the SCell is the non-dormancy cell, a dormancy BWP in the SCell to the non-dormancy BWP, where no first USS exists on the non-dormancy BWP, and the first USS is a USS that includes a PDCCH candidate capable of carrying a PDCCH for scheduling the data of the third cell. In this case, the terminal device determines to monitor, in the at least one USS in the SCell, the PDCCH for scheduling the data of the third cell.

Alternatively, the terminal device switches, based on an SCell dormancy indication field in DCI format 2_6 indicating that the SCell is a non-dormancy cell, the dormancy BWP in the SCell to the non-dormancy BWP in the SCell, where no first USS exists on the non-dormancy BWP, and the first USS is a USS that includes a PDCCH candidate capable of carrying a PDCCH for scheduling the data of the third cell. In this case, the terminal device determines to monitor, in the at least one USS in the SCell, the PDCCH for scheduling the data of the third cell.

Scenario b4: The first cell is a primary cell PCell, the second cell is a secondary cell SCell, the third cell is a primary cell PCell or a secondary cell SCell, the first indication information is carried in DCI, and the first indication information includes an indication for switching a search space set in the SCell.

The terminal device receives DCI format 2_0 indicating search space set switching in the PCell, where the indication for switching the search space set indicates that the first USS exists in a search space set to be switched to. In the first slot after a slot to which a symbol carrying the PDCCH of DCI format 2_0 and a symbol of a switching capability $P_{switch}$ belong, the terminal device determines to monitor, in the at least one first USS in the SCell, the PDCCH for scheduling the data of the third cell, and determines to monitor, in the at least one USS in the PCell, a PDCCH for scheduling the data of the third cell.

Alternatively, the terminal device monitors, in the at least one first USS in the PCell, the PDCCH for scheduling the data of the third cell, and when the timer expires in a current slot, the terminal device is in the first slot after the current slot to which a symbol of the PDCCH belongs. The terminal device determines to monitor, in the at least one first USS in the SCell, the PDCCH for scheduling the data of the third cell, and determines to monitor, in the at least one USS in the PCell, a PDCCH for scheduling the data of the third cell.

Alternatively, the terminal device monitors, on the USS whose identity is 0 of the search space group, the PDCCH for scheduling the data of the third cell. In the PCell, and in the first slot after a slot to which a symbol carrying a PDCCH of the DCI format and a symbol of a switching capability $P_{switch}$ belong, the terminal device determines to monitor, in the at least one first USS in the SCell, a PDCCH for scheduling the data of the third cell, and determines to stop monitoring, in the at least one USS in the PCell, a PDCCH for scheduling the data of the third cell.

Scenario b5: The first cell is a primary cell PCell, the second cell is a secondary cell SCell, the third cell is a primary cell PCell or a secondary cell SCell, and the first indication information includes an indication for switching a BWP in the PCell.

The terminal device switches to a BWP to be switched to based on the indication for switching the BWP in the PCell, where no first USS exists on the BWP to be switched to, and the first USS is a USS that includes a PDCCH candidate capable of carrying a PDCCH for scheduling the data of the third cell. In this case, the terminal device determines to monitor, in the at least one USS in the SCell, the PDCCH for scheduling the data of the third cell, and determines to stop monitoring, in the at least one first USS in the PCell, the PDCCH for scheduling the data of the third cell.

Scenario b6: The first cell is a primary cell PCell, the second cell is a secondary cell SCell, the third cell is a primary cell PCell or a secondary cell SCell, and the first indication information includes an indication for switching a search space set in the PCell.

The terminal device switches a BWP to be switched to based on the indication for switching the search space set in the PCell, where no first USS exists on the BWP to be switched to, and the first USS is a USS that includes a PDCCH candidate capable of carrying a PDCCH for scheduling the data of the third cell. In this case, the terminal device determines to monitor, in the at least one USS in the SCell, the PDCCH for scheduling the data of the third cell, and determines to stop monitoring, in the at least one first USS in the PCell, the PDCCH for scheduling the data of the third cell.

Scenario c1: The first cell is a first secondary cell SCell, the second cell is a second secondary cell SCell, the third cell is a first SCell or a second SCell, and the first indication information includes an indication for activating the second SCell.

The terminal device activates the second SCell based on the indication for activating the second SCell. In this case, the terminal device determines to monitor, in the at least one first USS in the second SCell, the PDCCH for scheduling the data of the third cell, and determines to stop monitoring, in the at least one USS in the first SCell, the PDCCH for scheduling the data of the third cell.

Scenario c2: The first cell is a first secondary cell SCell, the second cell is a second secondary cell SCell, the third cell is a first SCell or a second SCell, the first indication information is carried in DCI, and the first indication information includes an indication for switching a BWP in the second SCell.

The terminal device switches a BWP to be switched to based on the indication for switching the BWP in the second SCell, where a first USS exists on the BWP to be switched to, and the first USS is a USS that includes a PDCCH candidate capable of carrying a PDCCH for scheduling the data of the third cell. In this case, the terminal device determines to monitor, in the at least one first USS in the second SCell, the PDCCH for scheduling the data of the third cell, and determines to stop monitoring, in the at least one USS in the first SCell, the PDCCH for scheduling the data of the third cell.

Scenario c3: The first cell is a first secondary cell SCell, the second cell is a second secondary cell SCell, the third cell is a first SCell or a second SCell, the first indication information is carried in DCI, and the first indication information includes an indication for configuring the second SCell to a non-dormancy cell.

The terminal device switches, based on an SCell dormancy indication field in DCI format 0_1 or 1_1 indicating that the second SCell is the non-dormancy cell, a dormant BWP in the second SCell to a non-dormancy BWP, where a first USS exists on the non-dormancy BWP and the first USS is a USS that includes a PDCCH candidate capable of carrying a PDCCH for scheduling the data of the third cell. In this case, the terminal device determines to monitor, in the at least one USS in the second SCell, the PDCCH for scheduling the data of the third cell, and determines to stop monitoring, in the at least one USS in the first SCell, the PDCCH for scheduling the data of the third cell.

Alternatively, the access network device configures a maximum of five SCell groups by using a parameter SCell-groups-for-dormancy-within-active-time. The SCell dormancy indication has a maximum of 5 bits, and each bit corresponds to one of the SCell groups. The terminal device switches the dormancy BWP in each second SCell in a corresponding SCell group to a non-dormancy BWP based on the bit indication '1', where a first USS exists on the non-dormancy BWP, and the first USS is a USS that includes a PDCCH candidate capable of carrying a PDCCH for scheduling the data of the third cell. In this case, the terminal device determines to monitor, in the at least one USS in the second SCell, the PDCCH for scheduling the data of the third cell, and determines to stop monitoring, in the at least one USS in the first SCell, the PDCCH for scheduling the data of the third cell.

Alternatively, the terminal device switches, based on a specific field in DCI format 1_1 indicating that the second SCell is a non-dormancy cell, a dormancy BWP in the second SCell to a non-dormancy BWP, where no first USS exists on the non-dormancy BWP, and the first USS is a USS that includes a PDCCH candidate capable of carrying a PDCCH for scheduling the data of the third cell. In this case, the terminal device determines to monitor, in the at least one USS in the second SCell, the PDCCH for scheduling the data of the third cell, and determines to stop monitoring, in the at least one USS in the first SCell, the PDCCH for scheduling the data of the third cell.

Alternatively, the terminal device switches, based on an SCell dormancy indication field in DCI format 2_6 indicating that the second SCell is the non-dormancy cell, a dormancy BWP in the second SCell to a non-dormancy BWP, where no first USS exists on the non-dormancy BWP, and the first USS is a USS that includes a PDCCH candidate capable of carrying a PDCCH for scheduling the data of the third cell. In this case, the terminal device determines to monitor, in the at least one USS in the second SCell, the PDCCH for scheduling the data of the third cell, and determines to stop monitoring, in the at least one USS in the first SCell, the PDCCH for scheduling the data of the third cell.

Scenario c4: The first cell is a first secondary cell SCell, the second cell is a second secondary cell SCell, the third cell is a first SCell or a second SCell, the first indication information is carried in DCI, and the first indication information includes an indication for switching a search space set in the second SCell.

The terminal device receives DCI format 2_0 indicating search space set switching in the PCell, where the indication for switching the search space set indicates that a first USS does not exist in a search space set to be switched to. In the first slot after a slot to which a symbol carrying the PDCCH of DCI format 2_0 and a symbol of a switching capability $P_{switch}$ belong, the terminal device determines to monitor, in the at least one first USS in the second SCell, the PDCCH for scheduling the data of the third cell, and determines to stop monitoring, in the at least one USS in the first SCell, the PDCCH for scheduling the data of the third cell.

Alternatively, the terminal device monitors, in the at least one first USS in the first SCell, the PDCCH for scheduling the data of the third cell, and when the timer expires in a current slot, the terminal device is in the first slot after the current slot to which a symbol of the PDCCH belongs. The terminal device determines to monitor, in the at least one first USS in the second SCell, the PDCCH for scheduling the data of the third cell, and determines to stop monitoring, in the at least one USS in the first SCell, the PDCCH for scheduling the data of the third cell.

Alternatively, the terminal device monitors, on the USS whose identity is 0 of the search space group, the PDCCH for scheduling the data of the third cell. In the first SCell, and in the first slot after a slot to which a symbol carrying a PDCCH of the DCI format and a symbol of a switching capability $P_{switch}$ belong, the terminal device determines to monitor, in the at least one first USS in the second SCell, the PDCCH for scheduling the data of the third cell, and determines to stop monitoring, in the at least one USS in the first SCell, the PDCCH for scheduling the data of the third cell.

Scenario d1: The first cell is a first secondary cell SCell, the second cell is a second secondary cell SCell, the third cell is a first SCell or a second SCell, and the first indication information includes an indication for deactivating the first SCell.

The terminal device deactivates the first SCell based on the indication for deactivating the first SCell, stops a deactivation timer sCellDeactivationTimer of the first SCell, or refreshes or clears all hybrid automatic repeat request buffers HARQ buffers of the first SCell. In this case, the terminal device determines to monitor, in the at least one first USS in the second SCell, the PDCCH for scheduling the data of the third cell.

Scenario d2: The first cell is a first secondary cell SCell, the second cell is a second secondary cell SCell, the third cell is a first SCell or a second SCell, the first indication information is carried in DCI, and the first indication information includes an indication for switching a BWP in the first SCell.

The terminal device switches to a BWP to be switched to based on the indication for switching the BWP in the first SCell, where no first USS exists on the BWP to be switched to, and the first USS is a USS that includes a PDCCH candidate capable of carrying a PDCCH for scheduling the data of the third cell. In this case, the terminal device determines to monitor, in the at least one first USS in the second SCell, the PDCCH for scheduling the data of the third cell.

Scenario d3: The first cell is a first secondary cell SCell, the second cell is a second secondary cell SCell, the third cell is a first SCell or a second SCell, the first indication information is carried in DCI, and the first indication information includes an indication for configuring the first SCell to a dormancy cell.

The terminal device switches, based on a secondary carrier dormancy indication SCell dormancy indication field in DCI format 0_1 or 1_1 indicating that the first SCell is the dormancy cell, an active BWP in the SCell to a dormant BWP, where no first USS exists on the dormant BWP, and the first USS is a USS that includes a PDCCH candidate capable of carrying a PDCCH for scheduling the data of the third cell. In this case, the terminal device determines to monitor, in the at least one first USS in the second SCell, the PDCCH for scheduling the data of the third cell, and determines to stop monitoring, in the at least one US S in the first SCell, the PDCCH for scheduling the data of the third cell.

Alternatively, the access network device configures a maximum of five SCell groups by using a parameter SCell-groups-for-dormancy-within-active-time. The SCell dormancy indication has a maximum of 5 bits, and each bit corresponds to one of the SCell groups. The terminal device switches a BWP in each activated first SCell in a corresponding SCell group to a dormant BWP based on the bit indication '0', where no first USS exists on the dormant BWP, and the first USS is a USS that includes a PDCCH candidate capable of carrying a PDCCH for scheduling the data of the third cell. In this case, the terminal device determines to monitor, in the at least one first USS in the second SCell, the PDCCH for scheduling the data of the third cell, and determines to stop monitoring, in the at least one USS in the first SCell, the PDCCH for scheduling the data of the third cell.

Alternatively, the terminal device switches, based on a specific field in DCI format 1_1 indicating that the first SCell is the dormancy cell, an active BWP in the first SCell to a dormant BWP, where no first USS exists on the dormant BWP, and the first USS is a USS that includes a PDCCH candidate capable of carrying a PDCCH for scheduling the data of the third cell. In this case, the terminal device determines to monitor, in the at least one first USS in the second SCell, the PDCCH for scheduling the data of the third cell, and determines to stop monitoring, in the at least one USS in the first SCell, the PDCCH for scheduling the data of the third cell.

Alternatively, the terminal device switches, based on an SCell dormancy indication field in DCI format 2_6 indicating that the first SCell is the dormancy cell, an active BWP in the first SCell to a dormant BWP, where no first USS exists on the dormant BWP, and the first USS is a USS that includes a PDCCH candidate capable of carrying a PDCCH for scheduling the data of the third cell. In this case, the terminal device determines to monitor, in the at least one first USS in the second SCell, the PDCCH for scheduling the data of the third cell, and determines to stop monitoring, in the at least one USS in the first SCell, the PDCCH for scheduling the data of the third cell.

Scenario d4: The first cell is a first secondary cell SCell, the second cell is a second secondary cell SCell, the third cell is a first SCell or a second SCell, the first indication information is carried in DCI, and the first indication information includes an indication for switching a search space set in the first SCell.

The terminal device receives DCI format 2_0 indicating the indication for switching the search space set in the first SCell, where the indication for switching the search space set indicates that a first USS exists in a search space set to be switched to. In the first slot after a slot to which a symbol carrying the PDCCH of DCI format 2_0 and a symbol of a switching capability $P_{switch}$ belong, the terminal device determines to monitor, in the at least one first USS in the second SCell, the PDCCH for scheduling the data of the third cell, and stops monitoring, in the at least one USS in the first SCell, the PDCCH for scheduling the data of the third cell.

Alternatively, the terminal device monitors, in the at least one first USS in the first SCell, the PDCCH for scheduling the data of the third cell, and when the timer expires in a current slot, the terminal device is in the first slot after the current slot to which a symbol of the PDCCH belongs. The terminal device determines to monitor, in the at least one first USS in the second SCell, the PDCCH for scheduling the data of the third cell, and stops monitoring, in the at least one USS in the first SCell, a PDCCH for scheduling the data of the third cell.

Alternatively, the terminal device monitors, on the USS whose identity is 1 of the search space group, the PDCCH for scheduling the data of the third cell. In the first SCell, and in the first slot after a slot to which a symbol carrying a PDCCH of the DCI format and a symbol of a switching capability $P_{switch}$ belong, the terminal device determines to monitor, in at least one first USS in the second SCell, the PDCCH for scheduling the data of the third cell, and stops monitoring, in at least one USS in the first SCell, the PDCCH for scheduling the data of the third cell.

S304: The access network device sends the PDCCH to the terminal device.

Further, to meet requirements of different scenarios, the first indication information provided in this embodiment of this application may include first-type indication information and second-type indication information. The first-type indication information is for determining to monitor, in a first set of USSs that belongs to the first USS in the second cell, a PDCCH for scheduling the data of the third cell. The second-type indication information is for determining to monitor, in a second set of USSs that belongs to the first USS in the second cell, a PDCCH for scheduling the data of the third cell.

The first-type indication information may include an indication of at least one of Scenario a1 to Scenario a6. Correspondingly, the second-type indication information may include an indication of at least one of Scenario a1 to Scenario a6. Alternatively, the first-type indication information may include an indication of at least one of Scenario b1 to Scenario b6. Correspondingly, the second-type indication information may include an indication of at least one of Scenario b1 to Scenario b6. Alternatively, the first-type indication information may include an indication of at least one of Scenario c1 to Scenario c4. Correspondingly, the second-type indication information may include an indication of at least one of Scenario c1 to Scenario c4. Alternatively, the first-type indication information may include an indication of at least one of Scenario d1 to Scenario d4. Correspondingly, the second-type indication information may include an indication of at least one of Scenario d1 to Scenario d4.

When the terminal device monitors, in the at least one USS in the PCell, the PDCCH for scheduling the data of the third cell, the terminal device determines, based on the indication for switching the USS in the PCell, to monitor, in the first set of USSs in the PCell, the PDCCH for scheduling the data of the third cell, and stopping monitoring, in the second set of USSs in the SCell, the PDCCH for scheduling the data of the third cell.

For example, Scenario a3 is still used. The first-type indication information includes the indication for configuring the SCell to the dormancy cell, and the terminal device may determine a possibility that no data is recently scheduled in the SCell. Therefore, the terminal device can determine to monitor, on the first set of USSs in the PCell, the PDCCH for scheduling the data of the third cell.

Scenario a4 is still used. The second-type indication information includes the indication for switching the search space set in the SCell, and the terminal device may determine that a PDCCH payload in the PCell decreases. Therefore, the terminal device can determine to monitor, on the second set of USSs in the PCell, the PDCCH for scheduling the data of the third cell.

Therefore, in this embodiment of this application, a plurality of sets of USSs are configured in each cell, and the first indication information indicates the terminal device to monitor, in each set of USSs in each cell, a PDCCH for scheduling the data of the third cell. This can meet different requirements of various scenarios, and has relatively high flexibility.

Further, FIG. 4 is a schematic flowchart of another cross-carrier scheduling method according to this embodiment of this application. As shown in FIG. 4, the cross-carrier scheduling method provided in this embodiment of this application may further include the following steps.

S303b: The terminal device determines, based on the first indication information, time for stopping monitoring, in the at least one USS in the first cell, the PDCCH for scheduling the data of the third cell, or determines start time for monitoring, in the at least one USS in the second cell, the PDCCH for scheduling the data of the third cell.

Correspondingly, S301b: The access network device determines, based on the first indication information, time for stopping sending, in the at least one USS in the first cell, the PDCCH for scheduling the data of the third cell, or determines start time for sending, in the at least one USS in the second cell, the PDCCH for scheduling the data of the third cell.

Manners in which the access network device and the terminal device determine the foregoing time are the same. Descriptions are provided below by using the terminal device as an example. In different scenarios, there are different manners in which the terminal device determines the time for stopping monitoring, in the at least one USS in the first cell, the PDCCH for scheduling the data of the third cell; or there are different manners in which the terminal device determines the start time for monitoring, in the at least one USS in the second cell, the PDCCH for scheduling the data of the third cell.

In a specific implementation, manners are described below in different scenarios.

1. Scenario a1, Scenario b1, Scenario c1, and Scenario d1

(1) When the first indication information is carried in RRC signaling or a MAC-CE, S303b may be specifically as follows:

The terminal device determines, based on valid time of deactivation of the first cell, the start time for monitoring, in the at least one USS in the second cell, the PDCCH for scheduling the data of the third cell.

Alternatively, the terminal device determines, based on valid time of activation of the second cell, the time for stopping monitoring, in the at least one USS in the first cell, the PDCCH for scheduling the data of the third cell.

(2) When the first indication information is carried in downlink control information DCI, S303b may be specifically as follows:

1. The terminal device determines, based on the DCI and time specified in a protocol, the time for stopping monitoring, in the at least one USS in the first cell, the PDCCH for scheduling the data of the third cell, or determines the start time for monitoring, in the at least one USS in the second cell, the PDCCH for scheduling the data of the third cell. The time specified in the protocol is related to DCI parsing time.

It should be understood that the terminal device is not configured with minimum K0 and searchSpaceSwitchingDelay-r16, and the terminal device determines, based on the first slot after a slot to which end time of the DCI and the time specified in the protocol belong, the time for stopping monitoring, in the at least one USS in the first cell, the PDCCH for scheduling the data of the third cell, or determines the start time for monitoring, in the at least one USS in the second cell, the PDCCH for scheduling the data of the third cell.

2. The terminal device determines, based on the DCI and time of switching a search space set, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is not configured with the minimum K0, the terminal device reports searchSpaceSwitchingDelay-r16 to the access network device, and the access network device delivers a switching capability $P_{switch}$ based on searchSpaceSwitchingDelay-r16. The terminal device determines, based on the end time of the DCI and the time of switching the search space set, the time for stopping monitoring, in the at least one USS in the first cell, the PDCCH for scheduling the data of the third cell, or determines the start time for monitoring, in the at least one USS in the second cell, the PDCCH for scheduling the data of the third cell.

3. The terminal device determines, based on the DCI and configured minimum K0, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is configured with the minimum K0, the terminal device does not report searchSpaceSwitchingDelay-r16 to the access network device, and the access network device does not deliver a switching capability $P_{switch}$. The terminal device determines, based on the end time of the DCI and the minimum K0, the time for stopping monitoring, in the at least one USS in the first cell, the PDCCH for scheduling the data of the third cell, or determines the start time for monitoring, in the at least one USS in the second cell, the PDCCH for scheduling the data of the third cell.

4. The terminal device determines, based on a larger one of the configured minimum K0 and time of switching a search space group, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is configured with the minimum K0, the terminal device reports searchSpaceSwitchingDelay-r16 to the access network device, and the access network device delivers a switching capability $P_{switch}$. The terminal device determines, based on the larger one of the minimum K0 and the time of switching the search space group, the time for stopping monitoring, in the at least one USS in the first cell, the PDCCH for scheduling the data of the third cell, or determines the start time for monitoring, in the at least one USS in the second cell, the PDCCH for scheduling the data of the third cell.

2. Scenario a2, Scenario a5, Scenario b2, Scenario b5, Scenario c2, and Scenario d2

S303*b* may be specifically as follows:

(1) The terminal device determines, based on valid time of switching a BWP in the first cell, the start time for monitoring, in the at least one USS in the second cell, the PDCCH for scheduling the data of the third cell, where the indication for switching the BWP indicates that no first USS exists on a BWP to be switched to, and the first USS is a USS that includes a PDCCH candidate capable of carrying a PDCCH for scheduling the data of the third cell.

(2) When the first indication information is carried in downlink control information DCI, S303*b* may be specifically as follows:

1. The terminal device determines, based on the DCI and time specified in a protocol, the time for stopping monitoring, in the at least one USS in the first cell, the PDCCH for scheduling the data of the third cell, or determines the start time for monitoring, in the at least one USS in the second cell, the PDCCH for scheduling the data of the third cell. The time specified in the protocol is related to DCI parsing time.

It should be understood that the terminal device is not configured with minimum K0 and searchSpaceSwitchingDelay-r16, and the terminal device determines, based on the first slot after a slot to which end time of the DCI and the time specified in the protocol belong, the time for stopping monitoring, in the at least one USS in the first cell, the PDCCH for scheduling the data of the third cell, or determines the start time for monitoring, in the at least one USS in the second cell, the PDCCH for scheduling the data of the third cell.

2. The terminal device determines, based on the DCI and valid time of switching a BWP, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is not configured with the minimum K0, the terminal device reports searchSpaceSwitchingDelay-r16 to the access network device, and the access network device delivers a switching capability $P_{switch}$ based on searchSpaceSwitchingDelay-r16. The terminal device determines, based on the end time of the DCI and the valid time of switching the BWP, the time for stopping monitoring, in the at least one USS in the first cell, the PDCCH for scheduling the data of the third cell, or determines the start time for monitoring, in the at least one USS in the second cell, the PDCCH for scheduling the data of the third cell.

3. The terminal device determines, based on the DCI and configured minimum K0, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is configured with the minimum K0, the terminal device does not report searchSpaceSwitchingDelay-r16 to the access network device, and the access network device does not deliver a switching capability $P_{switch}$. The terminal device determines, based on the end time of the DCI and the minimum K0, the time for stopping monitoring, in the at least one USS in the first cell, the PDCCH for scheduling the data of the third cell, or determines the start time for monitoring, in the at least one USS in the second cell, the PDCCH for scheduling the data of the third cell.

4. The terminal device determines, based on the configured minimum K0 and the valid time of switching the BWP, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is configured with the minimum K0, the terminal device reports searchSpaceSwitchingDelay-r16 to the access network device, and the access network device delivers a switching capability $P_{switch}$. The terminal device determines, based on the minimum K0 and the valid time of switching the BWP, the time for stopping monitoring, in the at least one USS in the first cell, the PDCCH for scheduling the data of the third cell, or determines the start time for monitoring, in the at least one USS in the second cell, the PDCCH for scheduling the data of the third cell.

3. Scenario a3, Scenario b3, Scenario c3, and Scenario d3

S303*b* may be specifically as follows:

(1) The terminal device determines, based on valid time at which the first cell is a dormancy cell, the start time for monitoring, in the at least one USS in the second cell, the PDCCH for scheduling the data of the third cell; or the terminal device determines, based on valid time at which the second cell is a non-dormancy cell, the time for stopping monitoring, in the at least one USS in the first cell, the PDCCH for scheduling the data of the third cell.

(2) When the first indication information is carried in downlink control information DCI, S303*b* may be specifically as follows:

1. The terminal device determines, based on the DCI and time specified in a protocol, the time for stopping monitoring, in the at least one USS in the first cell, the PDCCH for scheduling the data of the third cell, or determines the start time for monitoring, in the at least one USS in the second cell, the PDCCH for scheduling the data of the third cell. The time specified in the protocol is related to DCI parsing time.

It should be understood that the terminal device is not configured with minimum K0 and searchSpaceSwitchingDelay-r16, and the terminal device determines, based on the first slot after a slot to which end time of the DCI and the time specified in the protocol belong, the time for stopping monitoring, in the at least one USS in the first cell, the PDCCH for scheduling the data of the third cell, or determines the start time for monitoring, in the at least one USS in the second cell, the PDCCH for scheduling the data of the third cell.

2. The terminal device determines, based on the DCI and valid time of the dormancy cell/non-dormancy cell, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is not configured with the minimum K0, the terminal device reports searchSpaceSwitchingDelay-r16 to the access network device, and the access network device delivers a switching capability $P_{switch}$ based on searchSpaceSwitchingDelay-r16. The terminal device determines, based on the end time of the DCI and the valid time of the dormancy cell/non-dormancy cell, the time for stopping monitoring, in the at least one USS in the first cell, the PDCCH for scheduling the data of the third cell, or determines the start time for monitoring, in the at least one USS in the second cell, the PDCCH for scheduling the data of the third cell.

3. The terminal device determines, based on the DCI and configured minimum K0, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is configured with the minimum K0, the terminal device does not report searchSpaceSwitchingDelay-r16 to the access network device, and the access network device does not deliver a switching capability $P_{switch}$. The terminal device determines, based on the end time of the DCI and the minimum K0, the time for stopping monitoring, in the at least one USS in the first cell, the PDCCH for scheduling the data of the third cell, or determines the start time for monitoring, in the at least one USS in the second cell, the PDCCH for scheduling the data of the third cell.

4. The terminal device determines, based on the configured minimum K0 and the valid time of the dormancy cell/non-dormancy cell, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is configured with the minimum K0, the terminal device reports searchSpaceSwitchingDelay-r16 to the access network device, and the access network device delivers a switching capability $P_{switch}$. The terminal device determines, based on the minimum K0 and the valid time of the dormancy cell/non-dormancy cell, the time for stopping monitoring, in the at least one USS in the first cell, the PDCCH for scheduling the data of the third cell, or determines the start time for monitoring, in the at least one USS in the second cell, the PDCCH for scheduling the data of the third cell.

4. Scenario a4, Scenario a6, Scenario b4, Scenario b6, Scenario c4, and Scenario d4

S303*b* may be specifically as follows:

(1) The terminal device determines, based on time of switching a search space set in the first cell, the start time for monitoring, in the at least one USS in the second cell, the PDCCH for scheduling the data of the third cell, where the indication for switching the search space set indicates that no USS exists in a search space set to be switched to.

(2) When the first indication information is carried in downlink control information DCI, S303*b* may be specifically as follows:

1. The terminal device determines, based on the DCI and the time of switching the search space set, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is not configured with the minimum K0, the terminal device reports searchSpaceSwitchingDelay-r16 to the access network device, and the access network device delivers a switching capability $P_{switch}$ based on searchSpaceSwitchingDelay-r16. The terminal device determines, based on end time of the DCI and the time of switching the search space set, the time for stopping monitoring, in the at least one USS in the first cell, the PDCCH for scheduling the data of the third cell, or determines the start time for monitoring, in the at least one USS in the second cell, the PDCCH for scheduling the data of the third cell.

2. The terminal device determines, based on configured minimum K0 and the time of switching the search space set, the time for stopping monitoring, in the at least one USS in the first cell, the PDCCH for scheduling the data of the third cell, or determines the start time for monitoring, in the at least one USS in the second cell, the PDCCH for scheduling the data of the third cell.

It should be understood that the terminal device is configured with the minimum K0, the terminal device reports searchSpaceSwitchingDelay-r16 to the access network device, and the access network device delivers a switching capability $P_{switch}$. The terminal device determines, based on the minimum K0 and the time of switching the search space set, the time for stopping monitoring, in the at least one USS in the first cell, the PDCCH for scheduling the data of the third cell, or determines the start time for monitoring, in the at least one USS in the second cell, the PDCCH for scheduling the data of the third cell.

In this embodiment of this application, in different scenarios, the terminal device determines the time for stopping monitoring, in the at least one USS in the first cell, the PDCCH for scheduling the data of the third cell; or determines the start time of monitoring, in the at least one USS in the second cell, the PDCCH for scheduling the data of the third cell, to ensure efficient switching between the two cells and reduce impact on scheduling of the first cell.

The solutions in the foregoing embodiments of this application may be combined on a premise that the solutions are not contradictory.

The foregoing mainly describes the solutions in embodiments of this application from the perspective of interaction between network elements. It may be understood that, to implement the foregoing functions, the network elements such as the access network device and the terminal device include at least one of corresponding hardware structures and software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional units in the access network device, the terminal device may be defined according to the foregoing method examples. For example, each functional unit may be defined in a correspondence to each function, or two or more functions may be integrated into one processing unit. The integrated unit may be implemented in a form of hardware, or may be implemented in a form of a software functional unit. It is to be noted that, in embodiments of this application, division into the units is an example, and is merely a logical function division. In actual implementation, another division manner may be used.

Figure 5:
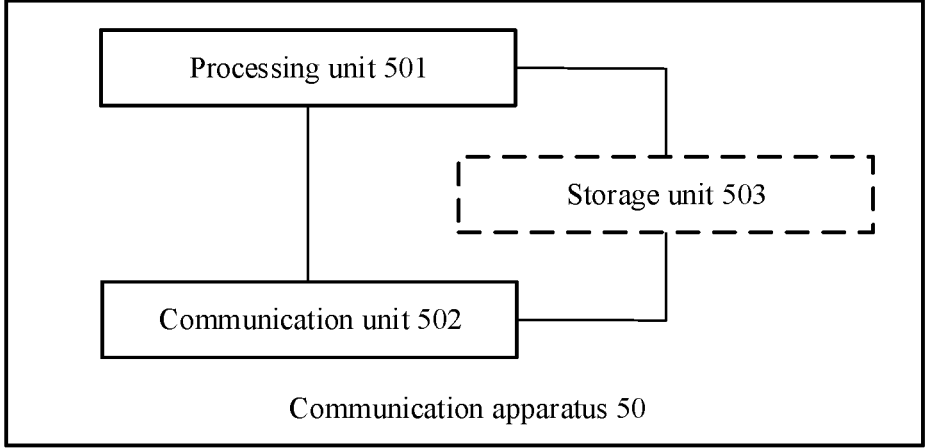
FIG. 5 is a schematic diagram of a structure of a communication apparatus according to an embodiment of this application.

When an integrated unit is used, FIG. 5 is a schematic diagram of a possible structure of a communication apparatus (denoted as a communication apparatus 50) in the foregoing embodiments. The communication apparatus 50 includes a processing unit 501 and a communication unit 502, and may further include a storage unit 503. The schematic diagram of the structure shown in FIG. 5 may be used to illustrate a structure of the access network device or the terminal device in the foregoing embodiments.

When the schematic diagram of the structure shown in FIG. 5 is used to illustrate the structure of the terminal device in the foregoing embodiments, the processing unit 501 is configured to control and manage actions of the terminal device, for example, control the terminal device to perform S302*a*, S302*c*, and S303*a* in FIG. 3, S302*a*, S302*c*, S303*a*, and S303*b* in FIG. 4, and/or an action performed by the terminal device in another process described in embodiments of this application. The processing unit 501 may communicate with another network entity via the communication unit 502, for example, communicate with the access network device shown in FIG. 1. The storage unit 503 is configured to store program code and data of the terminal device.

When the schematic diagram of the structure shown in FIG. 5 is used to show the structure of the terminal device in the foregoing embodiments, the communication apparatus 50 may be a terminal device, or may be a chip in the terminal device.

When the schematic diagram of the structure shown in FIG. 5 is used to illustrate the structure of the access network device in the foregoing embodiments, the processing unit 501 is configured to control and manage actions of the access network device, for example, control the access network device to perform S301*a*, S302*b*, and S304 in FIG. 3, S301*a*, S301*b*, S302*b*, and S304 in FIG. 4, and/or an action performed by the terminal device in another process described in embodiments of this application. The processing unit 501 may communicate with another network entity via the communication unit 502, for example, communicate with the terminal device shown in FIG. 1. The storage unit 503 is configured to store program code and data of the access network device.

When the schematic diagram of the structure shown in FIG. 5 is used to illustrate the structure of the access network device in the foregoing embodiments, the communication apparatus 50 may be an access network device, or may be a chip in the access network device.

When the communication apparatus 50 is a terminal device or an access network device, the processing unit 501 may be a processor or a controller, and the communication unit 502 may be a communication interface, a transceiver, a transceiver device, a transceiver circuit, a transceiver apparatus, or the like. The communication interface is a general term, and may include one or more interfaces. The storage unit 503 may be a memory. When the communication apparatus 50 is a chip in a terminal device or an access network device, the processing unit 501 may be a processor or a controller, and the communication unit 502 may be an input interface and/or an output interface, a pin, a circuit, or the like. The storage unit 503 may be a storage unit (for example, a register or a cache) in the chip, or may be a storage unit (for example, a read-only memory (ROM for short) or a random access memory (RAM for short)) outside the chip and in the terminal device or the access network device.

The communication unit may also be referred to as a transceiver unit. An antenna and a control circuit that have receiving and sending functions in the communication apparatus 50 may be considered as the communication unit 502 of the communication apparatus 50, and a processor that has a processing function may be considered as the processing unit 501 of the communication apparatus 50. Optionally, a component configured to implement a receiving function in the communication unit 502 may be considered as a receiving unit. The receiving unit is configured to perform a receiving step in embodiments of this application. The receiving unit may be a receiver machine, a receiver, a receiver circuit, or the like.

In an implementation process, the steps in the method provided in embodiments may be completed by using a hardware integrated logic circuit in the processor, or by using instructions in a form of software. The steps of the method disclosed with reference to embodiments of this application may be directly performed by a hardware processor, or may be performed by using a combination of hardware in the processor and a software module.

The processor in this application may include but is not limited to at least one of the following types: a central processing unit (CPU), a microprocessor, a digital signal processor (DSP), a microcontroller unit (MCU), or a computing device used for running software like an artificial intelligence processor. Each computing device may include one or more cores used to execute software instructions to perform operations or processing. The processor may be an independent semiconductor chip, or may be integrated with another circuit into a semiconductor chip. For example, the processor may form a system-on-a-chip (SoC) with another circuit (such as a codec circuit, a hardware acceleration circuit, or various buses and interface circuits). Alternatively, the processor may be integrated into an ASIC as a built-in processor of the ASIC, and the ASIC integrated with the processor may be separately packaged, or may be packaged with another circuit. In addition to the core configured to execute software instructions to perform the operation or processing, the processor may further include a necessary hardware accelerator, for example, a field programmable gate array (FPGA), a programmable logic device (PLD), or a logic circuit that implements a dedicated logic operation.

The memory in embodiments of this application may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing access network device and terminal device.

An embodiment of this application further provides a chip. The chip includes a processor and an interface circuit. The interface circuit is coupled to the processor. The processor is configured to run computer programs or instructions, to implement the foregoing methods. The interface circuit is used to communicate with another module outside the chip.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, performed by a terminal device, or a chip for the terminal device, comprising:

monitoring, in at least one user equipment (UE)-specific search space (USS) in a first cell, a physical downlink control channel (PDCCH) for scheduling data of a third cell;

receiving first indication information, wherein the first indication information is for determining to stop monitoring, in the at least one USS in the first cell, the PDCCH for scheduling the data of the third cell, or the first indication information is for determining to monitor, in at least one USS in a second cell, a PDCCH for scheduling the data of the third cell, and the third cell is the first cell or the second cell, wherein the first indication information comprises at least one of:
an indication for deactivating the first cell; or
an indication for configuring the first cell to a dormancy cell; and stopping, based on the first indication information, monitoring in the at least one USS in the first cell, the PDCCH for scheduling the data of the third cell, or determining to monitor, in the at least one USS in the second cell, the PDCCH for scheduling the data of the third cell.

2. The method according to claim 1, wherein the first indication information comprises at least one of:
an indication for switching a bandwidth part (BWP) in the first cell, wherein the indication for switching the BWP indicates that no first USS exists on a BWP to be switched to, and the first USS is a USS that comprises a PDCCH candidate capable of carrying the PDCCH for scheduling data of the third cell;
an indication for switching a search space set in the first cell, wherein the indication for switching the search space set indicates that no first USS exists in a search space set to be switched to.

3. The method according to claim 2, wherein:
the first indication information comprises first-type indication information and second-type indication information,
the first-type indication information is for determining to monitor, in a first set of USSs in the second cell, the PDCCH for scheduling the data of the third cell, wherein the first USS belongs to the first set of USSs, and
the second-type indication information is for determining to monitor, in a second set of USSs in the second cell, the PDCCH for scheduling the data of the third cell, wherein the first USS belongs to the second set of USSs.

4. The method according to claim 1, wherein the first indication information comprises at least one of:
an indication for activating the second cell, wherein a first USS exists in a search space set of the second cell that is activated, and the first USS is a USS that comprises a PDCCH candidate capable of carrying the PDCCH for scheduling data of the third cell;
an indication for switching a BWP in the second cell, wherein the indication for switching the BWP indicates that the first USS exists on a BWP to be switched to;
an indication for configuring the second cell to a non-dormancy cell, wherein the first USS exists in a search space set of the second cell that is the non-dormancy cell; or
an indication for switching a search space set in the second cell, wherein the indication for switching the search space set indicates that the first USS exists in a search space set to be switched to.

5. The method according to claim 1, further comprising:
determining, based on the first indication information, time for stopping monitoring, in the at least one USS in the first cell, the PDCCH for scheduling the data of the third cell; or
determining start time for monitoring, in the at least one USS in the second cell, the PDCCH for scheduling the data of the third cell.

6. A method, performed by an access network device, or a chip for the access network device, comprising:
determining to stop sending, in at least one user equipment (UE)-specific search space (USS) in a first cell, a physical downlink control channel (PDCCH) for scheduling data of a third cell;
determining to send, in at least one USS in a second cell, a PDCCH for scheduling the data of the third cell, wherein the third cell is the first cell or the second cell; and
sending, first indication information to a terminal device, wherein the first indication information is for determining to stop monitoring, in the at least one USS in the first cell, the PDCCH for scheduling the data of the third cell, or the first indication information is for determining to monitor, in the at least one USS in the second cell, the PDCCH for scheduling the data of the third cell, wherein the first indication information comprises at least one of:

an indication for deactivating the first cell; or an indication for configuring the first cell to a dormancy cell.

7. The method according to claim 6, wherein the first indication information comprises at least one of:

an indication for switching a bandwidth part (BWP) in the first cell, wherein the indication for switching the BWP indicates that no first USS exists on a BWP to be switched to, and the first USS is a USS that comprises a PDCCH candidate capable of carrying the PDCCH for scheduling data of the third cell; or an indication for switching a search space set in the first cell, wherein the indication for switching the search space set indicates that no first USS exists in a search space set to be switched to.

8. The method according to claim 7, wherein:

the first indication information comprises first-type indication information and second-type indication information, the first-type indication information indicates the terminal device to determine to monitor, in a first set of USSs in the second cell, the PDCCH for scheduling the data of the third cell, wherein the first USS belongs to the first set of USSs, and the second-type indication information indicates the terminal device to determine to monitor, in a second set of USSs in the second cell, the PDCCH for scheduling the data of the third cell, wherein the first USS belongs to the second set of USSs.

9. The method according to claim 6, wherein the first indication information comprises at least one of:

an indication for activating the second cell, wherein a first USS exists in a search space set of the second cell that is activated, and the first USS is a USS that comprises a PDCCH candidate capable of carrying the PDCCH for scheduling data of the third cell;

an indication for switching a BWP in the second cell, wherein the indication for switching the BWP indicates that the first USS exists on a BWP to be switched to;

an indication for configuring the second cell to a non-dormancy cell, wherein the first USS exists in a search space set of the second cell that is the non-dormancy cell; or an indication for switching a search space set in the second cell, wherein the indication for switching the search space set indicates that the first USS exists in a search space set to be switched to.

10. The method according to claim 6, further comprising:

determining, by the access network device based on the first indication information, time for stopping sending, in the at least one USS in the first cell, the PDCCH for scheduling the data of the third cell; or determining, by the access network device, start time for sending, in the at least one USS in the second cell, the PDCCH for scheduling the data of the third cell.

11. An apparatus, wherein the apparatus is a terminal device or a chip for the terminal device, and the apparatus comprises:

at least one processor; and at least one memory coupled to the at least one processor and configured to store executable instructions for execution by the at least one processor to instruct the at least one processor to:

monitor, in at least one user equipment (UE)-specific search space (USS) in a first cell, a physical downlink control channel (PDCCH) for scheduling data of a third cell;

receive first indication information, wherein the first indication information is for determining to stop monitoring, in the at least one USS in the first cell, the PDCCH for scheduling the data of the third cell, or the first indication information is for determining to monitor, in at least one USS in a second cell, a PDCCH for scheduling the data of the third cell, and the third cell is the first cell or the second cell, wherein the first indication information comprises at least one of:

an indication for deactivating the first cell; or an indication for configuring the first cell to a dormancy cell; and stop, based on the first indication information, monitoring in the at least one USS in the first cell, the PDCCH for scheduling the data of the third cell, or determine to monitor, in the at least one USS in the second cell, the PDCCH for scheduling the data of the third cell.

12. The apparatus according to claim 11, wherein the first indication information comprises at least one of:

an indication for switching a bandwidth part (BWP) in the first cell, wherein the indication for switching the BWP indicates that no first USS exists on a BWP to be switched to, and the first USS is a USS that comprises a PDCCH candidate capable of carrying the PDCCH for scheduling data of the third cell;

an indication for switching a search space set in the first cell, wherein the indication for switching the search space set indicates that no first USS exists in a search space set to be switched to.

13. The apparatus according to claim 12, wherein the first indication information comprises first-type indication information and second-type indication information, the first-type indication information is for determining to monitor, in a first set of USSs in the second cell, the PDCCH for scheduling the data of the third cell, wherein the first USS belongs to the first set of USSs, and the second-type indication information is for determining to monitor, in a second set of USSs in the second cell, the PDCCH for scheduling the data of the third cell, wherein the first USS belongs to the second set of USSs.

14. The apparatus according to claim 11, wherein the first indication information comprises at least one of:

an indication for activating the second cell, wherein a first USS exists in a search space set of the second cell that is activated, and the first USS is a USS that comprises a PDCCH candidate capable of carrying the PDCCH for scheduling data of the third cell;

an indication for switching a BWP in the second cell, wherein the indication for switching the BWP indicates that the first USS exists on a BWP to be switched to;

an indication for configuring the second cell to a non-dormancy cell, wherein the first USS exists in a search space set of the second cell that is the non-dormancy cell; or an indication for switching a search space set in the second cell, wherein the indication for switching the search space set indicates that the first USS exists in a search space set to be switched to.

15. The apparatus according to claim 11, wherein the executable instructions are for execution by the at least one processor to instruct the at least one processor instruct the at least one processor to:

determine, based on the first indication information, time for stopping monitoring, in the at least one USS in the first cell, the PDCCH for scheduling the data of the third cell; or determine, start time for monitoring, in the at least one USS in the second cell, the PDCCH for scheduling the data of the third cell.

16. An apparatus, wherein the apparatus is a access network device or a chip for the access network device, and the apparatus comprises:

at least one processor; and at least one memory coupled to the at least one processor and configured to store executable instructions for execution by the at least one processor to instruct the at least one processor to:

determine to stop sending, in at least one user equipment (UE)-specific search space (USS) in a first cell, a physical downlink control channel (PDCCH) for scheduling data of a third cell;

determine to send, in at least one USS in a second cell, a PDCCH for scheduling the data of the third cell, wherein the third cell is the first cell or the second cell; and send first indication information to a terminal device, wherein the first indication information is for determining to stop monitoring, in the at least one USS in the first cell, the PDCCH for scheduling the data of the third cell, or the first indication information is for determining to monitor, in the at least one USS in the second cell, the PDCCH for scheduling the data of the third cell, wherein the first indication information comprises at least one of:

an indication for deactivating the first cell; or an indication for configuring the first cell to a dormancy cell.

17. The apparatus according to claim 16, wherein the first indication information comprises at least one of:

an indication for switching a bandwidth part (BWP) in the first cell, wherein the indication for switching the BWP indicates that no first USS exists on a BWP to be switched to, and the first USS is a USS that comprises a PDCCH candidate capable of carrying the PDCCH for scheduling data of the third cell;

an indication for switching a search space set in the first cell, wherein the indication for switching the search space set indicates that no first USS exists in a search space set to be switched to.

18. The apparatus according to claim 17, wherein:

the first indication information comprises first-type indication information and second-type indication information, the first-type indication information indicates the terminal device to determine to monitor, in a first set of USSs in the second cell, the PDCCH for scheduling the data of the third cell, wherein the first USS belongs to the first set of USSs, and the second-type indication information indicates the terminal device to determine to monitor, in a second set of USSs in the second cell, the PDCCH for scheduling the data of the third cell, wherein the first USS belongs to the second set of USSs.

19. The apparatus according to claim 16, wherein the first indication information comprises at least one of:

an indication for activating the second cell, wherein a first USS exists in a search space set of the second cell that is activated, and the first USS is a USS that comprises a PDCCH candidate capable of carrying the PDCCH for scheduling data of the third cell;

an indication for switching a BWP in the second cell, wherein the indication for switching the BWP indicates that the first USS exists on a BWP to be switched to;

an indication for configuring the second cell to a non-dormancy cell, wherein the first USS exists in a search space set of the second cell that is the non-dormancy cell; or an indication for switching a search space set in the second cell, wherein the indication for switching the search space set indicates that the first USS exists in a search space set to be switched to.

20. The apparatus according to claim 16, wherein the executable instructions are for execution by the at least one processor to instruct the at least one processor to:

determine, based on the first indication information, time for stopping sending, in the at least one USS in the first cell, the PDCCH for scheduling the data of the third cell; or determining start time for sending, in the at least one USS in the second cell, the PDCCH for scheduling the data of the third cell.

* * * * *